United States Patent
Husted

(10) Patent No.: US 9,973,268 B1
(45) Date of Patent: May 15, 2018

(54) REUSING FREQUENCIES AMONG HIGH ALTITUDE PLATFORMS

(71) Applicant: Google Inc., Mountain View, CA (US)

(72) Inventor: Paul James Husted, San Jose, CA (US)

(73) Assignee: Google LLC, Mountain View, CA (US)

(*) Notice: Subject to any disclaimer, the term of this patent is extended or adjusted under 35 U.S.C. 154(b) by 194 days.

(21) Appl. No.: 15/155,741

(22) Filed: May 16, 2016

(51) Int. Cl.
| | | |
|---|---|---|
| *H04W 40/00* | (2009.01) | |
| *H04B 7/185* | (2006.01) | |
| *H04W 72/04* | (2009.01) | |
| *H04J 11/00* | (2006.01) | |
| *H04W 56/00* | (2009.01) | |

(52) U.S. Cl.
CPC ...... *H04B 7/18534* (2013.01); *H04J 11/0023* (2013.01); *H04W 56/0025* (2013.01); *H04W 72/0453* (2013.01); *H04W 72/0473* (2013.01)

(58) Field of Classification Search
CPC ............ H04B 7/18534; H04J 11/0023; H04W 56/0025
USPC ....................................................... 455/428
See application file for complete search history.

(56) References Cited

U.S. PATENT DOCUMENTS

| | | | |
|---|---|---|---|
| 5,894,590 A | 4/1999 | Vatt et al. | |
| 7,558,569 B2* | 7/2009 | Chang | H04B 7/18506 455/12.1 |
| 8,068,827 B2 | 11/2011 | Miller et al. | |
| 8,213,929 B2 | 7/2012 | Miller et al. | |
| 8,676,192 B2* | 3/2014 | Jalali | H01Q 1/2291 455/432.1 |
| 8,897,769 B2 | 11/2014 | Miller et al. | |
| 9,319,172 B2* | 4/2016 | Jalali | H04L 1/0001 |
| 9,848,391 B2* | 12/2017 | Jalali | H04W 52/241 |
| 2015/0236781 A1* | 8/2015 | Jalali | H04W 84/06 370/252 |
| 2017/0311178 A1* | 10/2017 | Feria | H04B 7/18506 |

* cited by examiner

*Primary Examiner* — Charles Shedrick
(74) *Attorney, Agent, or Firm* — Honigman Miller Schwartz and Cohn LLP

(57) ABSTRACT

A method for determining a frequency usage pattern of one or more satellites includes receiving, at data processing hardware, identifications of one or more satellite communication frequencies used by a satellite at corresponding locations of the satellite along a non-geostationary satellite orbit. The method includes determining, by the data processing hardware, a pattern of frequency usage by the satellite at the corresponding locations of the satellite. The method also includes instructing, by the data processing hardware, communication between a high altitude platform and a ground terminal using an identified satellite communication frequency during a non-interfering period of time based on the pattern of frequency usage by the satellite. The high altitude platform has an altitude lower than the satellite.

21 Claims, 20 Drawing Sheets

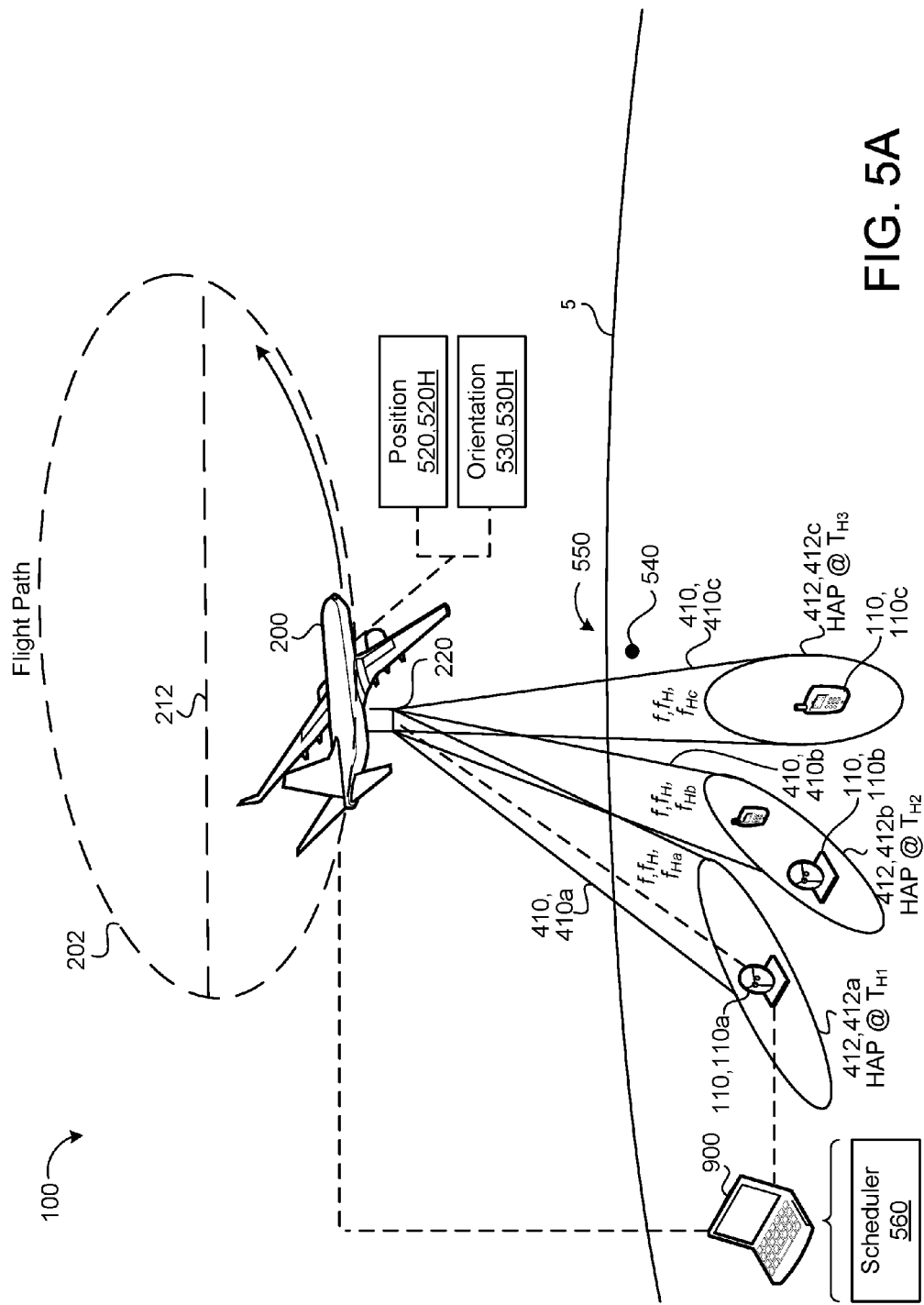

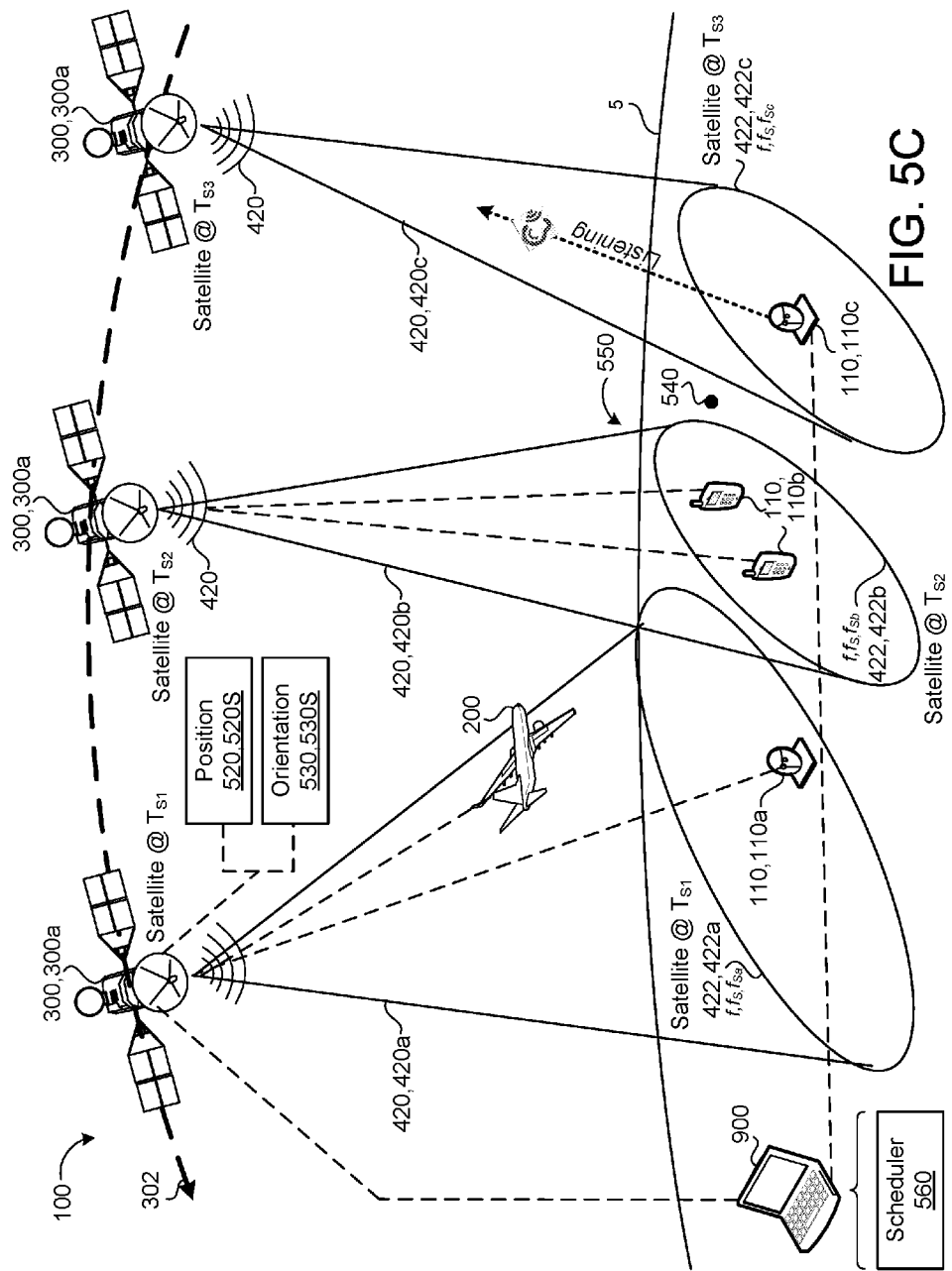

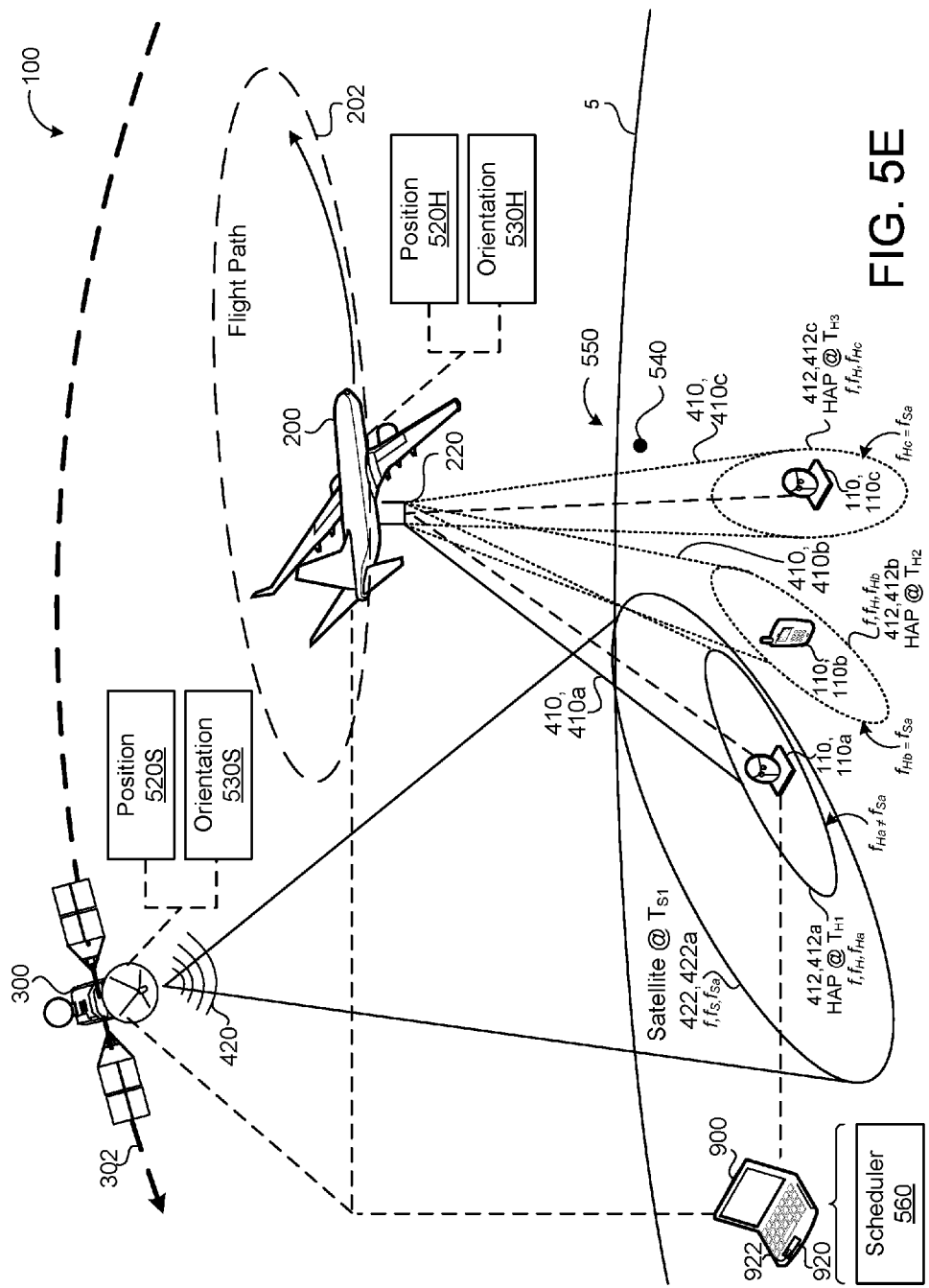

REUSING FREQUENCIES AMONG HIGH ALTITUDE PLATFORMS

TECHNICAL FIELD

This disclosure relates to reusing frequencies among high altitude platforms.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. Airborne communication networks provisioned for wireless communication services can aid coverage and capacity of the communication network.

An airborne communication network sometimes includes satellites and/or airborne base stations, such as high altitude platform stations (HAPSs). A high altitude platform (HAP) is generally considered a station on an object (e.g., a high-altitude balloon or an aircraft system) at an altitude of 17 to 50 kilometers and at a specified, nominal, fixed point relative to Earth. The station typically has equipment for carrying on communications via radio waves. Generally, the equipment includes a receiver and/or a transmitter, an antenna, and control circuitry. In operation, the HAPS may fly in a particular pattern or along a particular path for a duration of time.

SUMMARY

As a non-geostationary satellite passes over a terrestrial base station, the terrestrial base station may observe a frequency usage pattern of the satellite's communications, while the satellite communicates with other terrestrial base stations and/or airborne base stations. Based on the observed frequency usage pattern, the terrestrial base stations and/or the airborne base stations may use the same frequencies as the satellite communications during non-interfering time periods (e.g., when the satellite is not communicating and/or when the satellite is not overhead, among other scenarios).

One aspect of the disclosure provides a method for reusing frequencies among high altitude platforms. The method includes receiving, at data processing hardware, identifications of one or more satellite communication frequencies used by a satellite at corresponding locations of the satellite along a non-geostationary satellite orbit, and determining, by the data processing hardware, a pattern of frequency usage by the satellite at the corresponding locations of the satellite. The method also includes instructing, by the data processing hardware, communication between a high altitude platform and a ground terminal using an identified satellite communication frequency during a non-interfering period of time based on the pattern of frequency usage by the satellite, the high altitude platform having an altitude lower than the satellite.

Implementations of the disclosure may include one or more of the following optional features. In some implementations, the method includes receiving the identifications of the one or more satellite communication frequencies used by the satellite from mobile devices. The method may also include steering, by the data processing hardware, an antenna of the ground terminal away from the high altitude platform and toward the satellite for a period of time when the ground terminal is not communicating with the high altitude platform. In some examples, the method includes identifying, using the antenna of the ground terminal, the one or more satellite communication frequencies used by the satellite at the corresponding locations of the satellite, and receiving the identifications of the one or more satellite communication frequencies used by the satellite from the ground terminal. The antenna may be a phased array antenna.

In some examples, identifying the one or more satellite communication frequencies used by the satellite includes measuring a signal power at a target frequency band. The method may also include steering the antenna of the ground terminal toward the high altitude platform when the ground terminal communicates with the high altitude platform. The method may also include modifying, by the data processing hardware, a power or a communication frequency. Additionally, the method may include modifying, by the data processing hardware, an activation of any communication beams of a phased array antenna of the ground terminal that pass in a shadow projected by the satellite through the high altitude platform to a ground surface, so as to not interfere with the one or more satellite communication frequencies used by the satellite.

In some implementations, the method includes receiving, at data processing hardware, identifications of one or more target communication frequencies used by at least one other frequency band user and determining, using the data processing hardware, a pattern of frequency usage by the at least one other frequency band user. The method may also include instructing, by the data processing hardware, communication between the ground terminal and the high altitude platform using an identified satellite communication frequency or an identified target communication frequency during a non-interfering period of time based on the pattern of frequency usage by the satellite and the pattern of frequency usage by the other least one frequency band user. In some examples, the method includes predicting, by the data processing hardware, potential communication interferences between each communication beam of the high altitude platform and the satellite based on a satellite map. Determining the pattern of frequency usage by the satellite may include generating the satellite map. The satellite map may include satellite locations of the satellite, and for each satellite location, at least one of a communication frequency or a communication signal power of the satellite. The method may also include predicting, by the data processing hardware, potential communication interferences between each communication beam of the high altitude platform and the satellite based on the pattern of frequency usage by the satellite. For each communication beam of the high altitude platform, the method may include selecting an identified satellite communication frequency for any communications via the communication beam during a corresponding non-interfering period of time for the communication beam.

Another aspect of the disclosure provides a method for reusing frequencies among high altitude platforms. The method includes steering an antenna of a ground terminal away from a high altitude platform and toward a satellite having a non-geostationary satellite orbit for a period of time when the ground terminal is not communicating with the high altitude platform. The high altitude platform has an altitude lower than the satellite. The method also includes identifying, using the antenna of the ground terminal, one or more satellite communication frequencies used by the satellite at corresponding locations of the satellite, and determining, using data processing hardware in communication with the ground terminal, a pattern of frequency usage by the satellite at the corresponding locations of the satellite.

Implementations of the disclosure may include one or more of the following optional features. In some implementations, the antenna of the ground terminal includes a phased array antenna. The method may also include steering the antenna of the ground terminal toward the high altitude platform when the ground terminal communicates with the high altitude platform. The method also includes instructing, by the data processing hardware, communication between the ground terminal and the high altitude platform using an identified satellite communication frequency during a non-interfering period of time based on the pattern of frequency usage by the satellite. The method may further include modifying, by the data processing hardware, a power, a communication frequency, or an activation of any communication beams of the antenna of the grouped terminal that pass in a shadow projected by the satellite through the high altitude platform to a ground surface, when the communication frequency includes the one or more satellite communication frequencies. Identifying the one or more satellite communication frequencies used by the satellite may include measuring a signal power at a target frequency band.

In some examples, the method includes steering the antenna of the ground terminal away from the high altitude platform and toward at least one other band user for another period of time when the ground terminal is not communicating with the high altitude platform. The method may also include identifying, using the phased array antenna of the ground terminal, one or more target communication frequencies used by the at least one other band user, and determining, using data processing hardware in communication with the ground terminal, a pattern of frequency usage by the at least one other band user. The method may further include steering the antenna of the ground terminal toward the high altitude platform when the ground terminal communicates with the high altitude platform. The method may also include instructing, by the data processing hardware, communication between the ground terminal and the high altitude platform using an identified satellite communication frequency or an identified target communication frequency during a non-interfering period of time based on the pattern of frequency usage by the satellite and the pattern of frequency usage by the at least one other band user.

In some examples, the high altitude platform includes a phased array antenna configured to project multiple communication beams toward earth. Each communication has a corresponding communication beam frequency. The method may also include predicting, by the data processing hardware, potential communication interferences between each communication beam of the high altitude platform and the satellite based on the pattern of frequency usage by the satellite. Determining the pattern of frequency usage by the satellite may include generating a satellite map. The satellite map may include satellite locations of the satellite, and for each satellite location, at least one of a communication frequency or a communication signal power of the satellite. For each communication beam of the high altitude platform, the method may include selecting an identified satellite communication frequency as the communication beam frequency during a corresponding non-interfering period of time for the communication beam based on the pattern of frequency usage by the satellite or the predicted potential communication interferences.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5A is a perspective schematic view of an airborne base station in communication with a terrestrial terminal.

FIG. 5C is a perspective schematic view of a satellite in communication with an airborne base station and a terrestrial terminal.

FIGS. 5E and 5F are perspective schematic views of a satellite in communication with a terrestrial terminal, and an airborne base station in communication with the terrestrial ground station.

Like reference symbols in the various drawings indicate like elements.

DETAILED DESCRIPTION

Figure 1A:
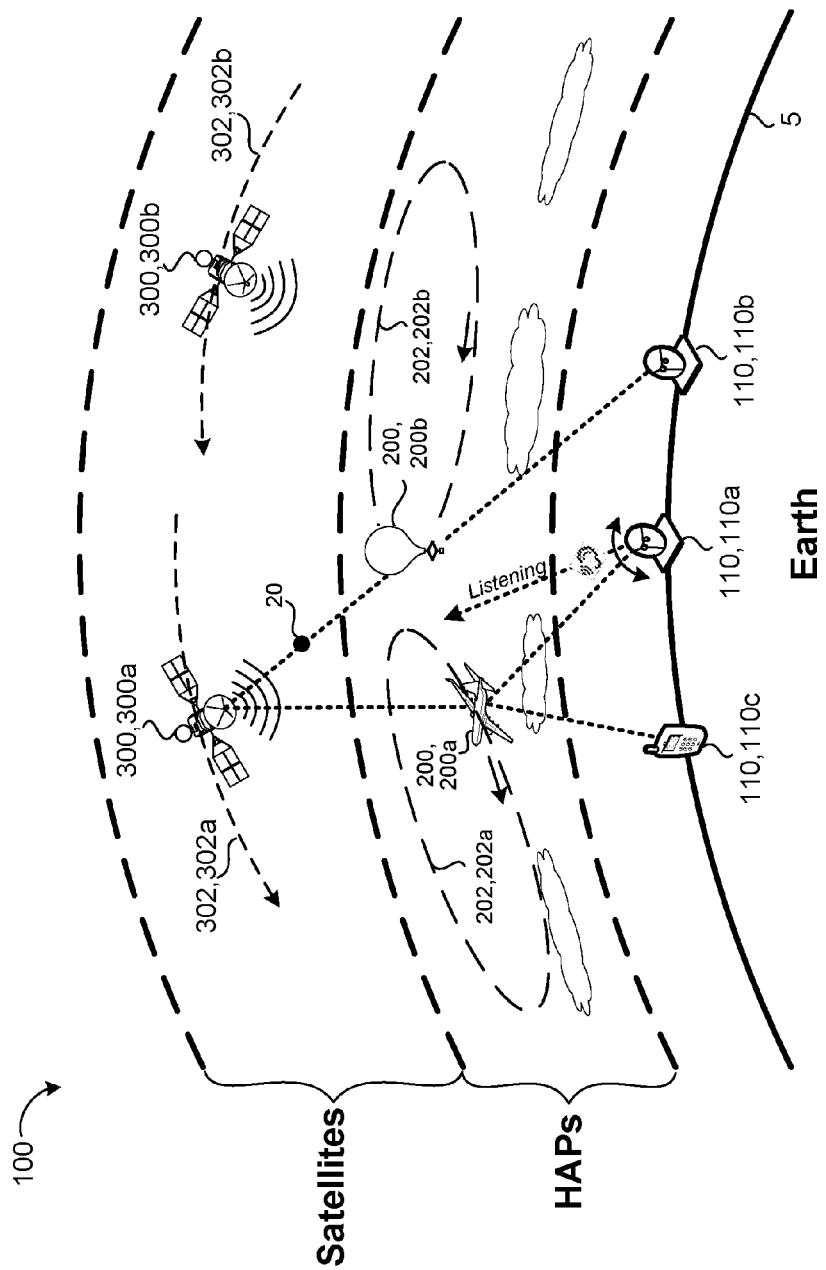
FIG. 1A is a schematic view of an exemplary global-scale communication system.
Figure 1B:
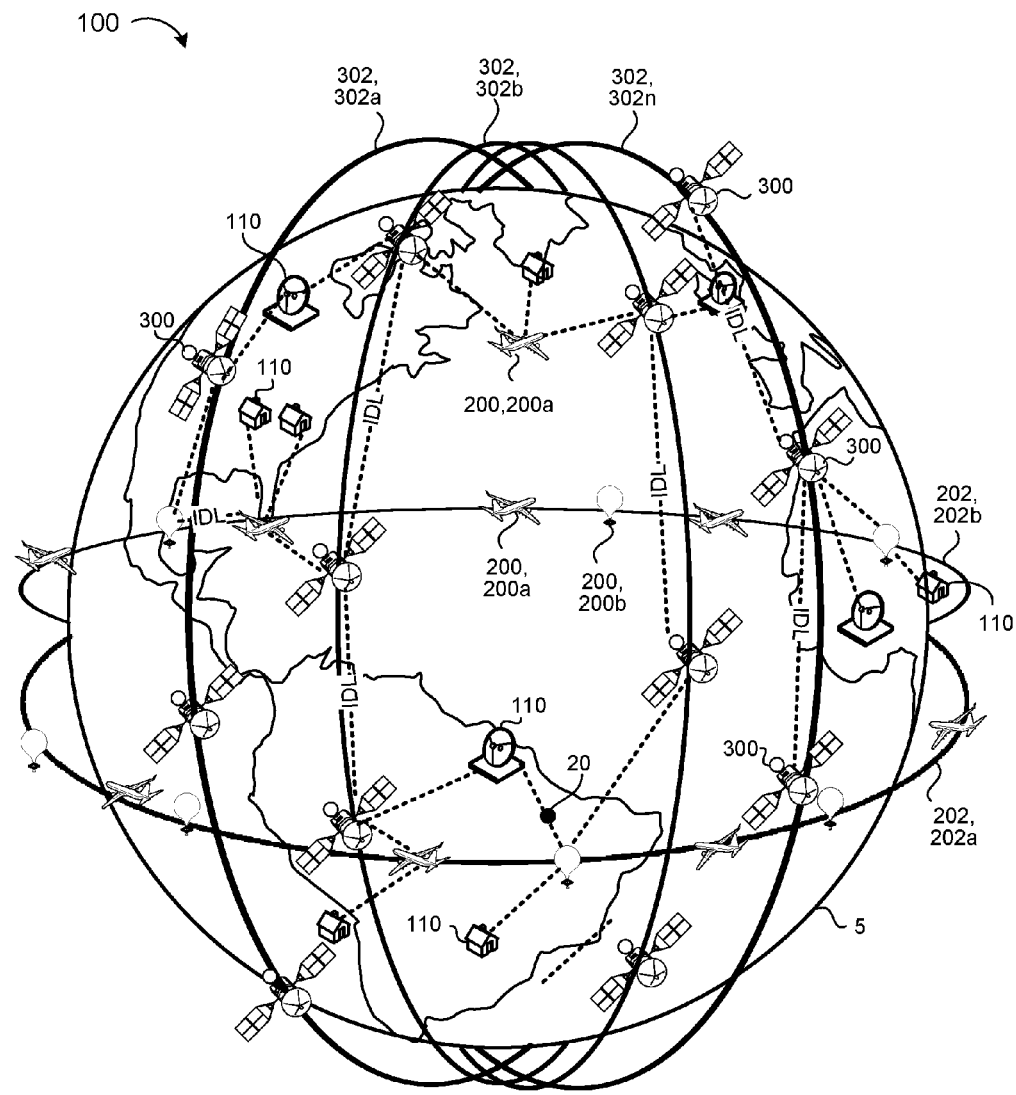
FIG. 1B is a schematic view of the exemplary global-scale communication system of FIG. 1A with satellites and communication balloons, where the satellites form a polar constellation.
Figure 1C:
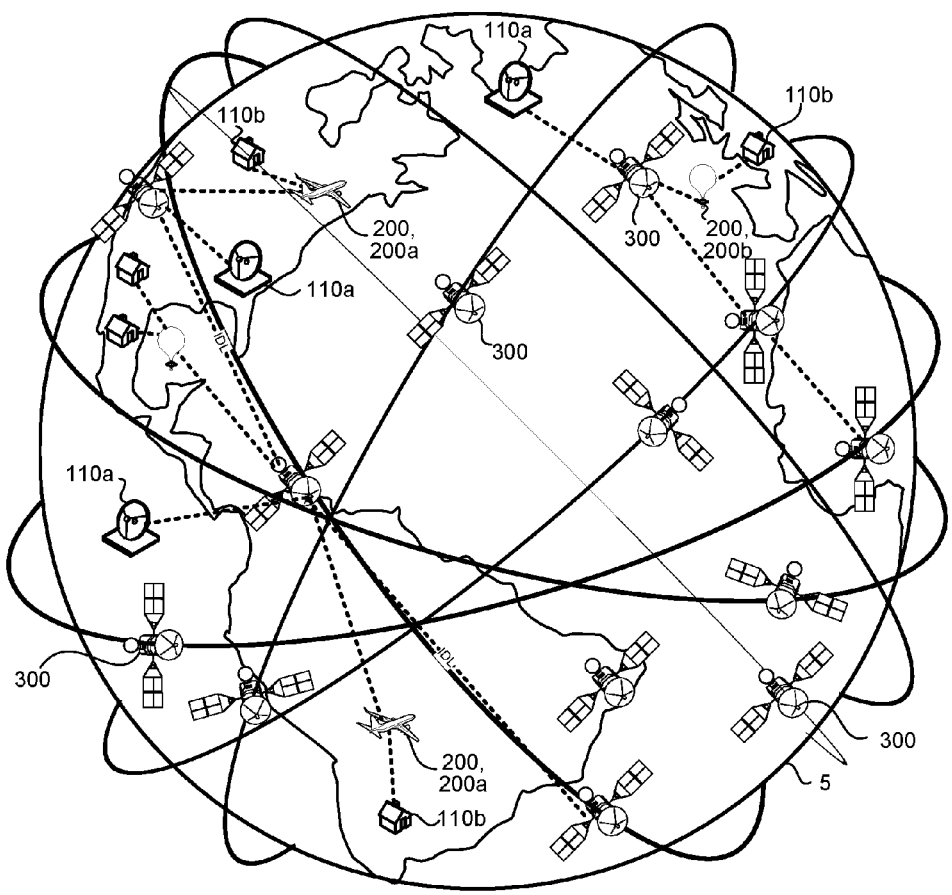
FIG. 1C is a schematic view of the exemplary group of satellites of FIG. 1A, where the satellites form a Walker constellation.

Referring to FIGS. 1A-1C, in some implementations, a global-scale communication system 100 includes terrestrial terminals 110 (e.g., ground base stations), high altitude platform stations (HAPSs) or airborne base stations 200, and satellites 300. HAPSs and airborne base stations 200 may be used interchangeably. The terrestrial terminal 110 may communicate with the satellites 300, the satellites 300 may communicate with the airborne base stations 200, and the airborne base stations 200 may communicate with the terrestrial terminals 110. In some examples, the terrestrial terminal 110 also operates as a linking-terrestrial terminal 110 linking two satellites 300. The terrestrial terminal 110 may be connected to one or more service providers and the terrestrial terminals 110 may be user terminals (e.g., mobile devices, residential WiFi devices, home networks, etc.). In some implementations, an airborne base station 200 is an aerial communication device that operates at high altitudes (e.g., 17-22 km). The airborne base station 200 may be released into the earth's atmosphere, e.g., by an aircraft, or flown to the desired height. Moreover, the airborne base station 200 may operate as a quasi-stationary aircraft. In some examples, the airborne base station 200 is an aircraft 200a, such as an unmanned aerial vehicle (UAV); while in other examples, the airborne base station 200 is a communication balloon 200b. The satellite 300 may be in Low Earth Orbit (LEO), Medium Earth Orbit (MEO), or High Earth Orbit (HEO), including Geosynchronous Earth Orbit (GEO).

The airborne base stations 200 may move about the earth 5 along a flight path, trajectory, or orbit 202 (also referred to as a plane, since their orbit or trajectory may approximately form a geometric plane). Moreover, several airborne base stations 200 may operate in the same or different flight paths 202. For example, some airborne base stations 200 may move approximately along a latitude of the earth 5 (or in a trajectory determined in part by prevailing winds) in a first orbit 202a, while other airborne base stations 200 may move along a different latitude or trajectory in a second orbit 202b. The airborne base stations 200 may be grouped amongst several different flight paths 202 about the earth 5 and/or they may move along other paths 202 (e.g., individual paths). Similarly, the satellites 300 may move along different orbits 302, 302a-n. Multiple satellites 300 working in concert form a satellite constellation. The satellites 300 within the satellite constellation may operate in a coordinated fashion to overlap in ground coverage. In the example shown in FIG. 1B, the satellites 300 operate in a polar constellation by having the satellites 300 orbit the poles of the earth 5. Whereas, in the example shown in FIG. 1C, the satellites 300 operate in a Walker constellation, which covers areas below certain latitudes and provides a larger number of satellites 300 simultaneously in view of a terrestrial terminal 110 on the ground (leading to higher availability, fewer dropped connections).

Figure 2B:
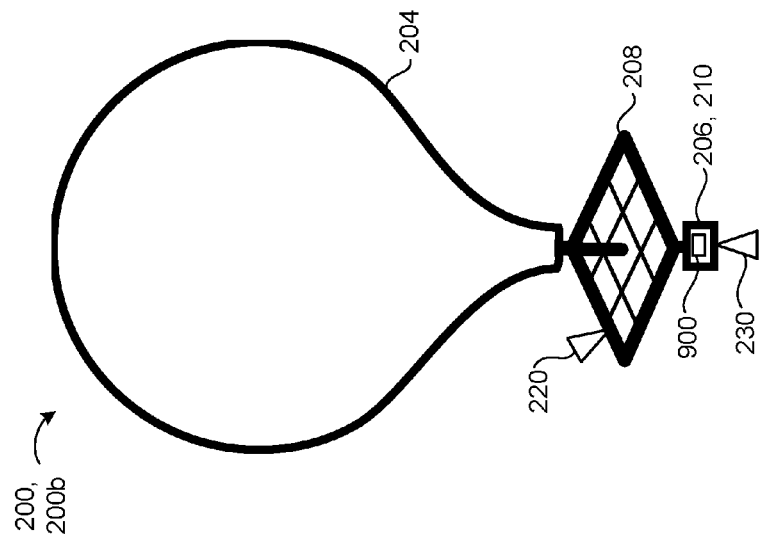
FIGS. 2A and 2B are perspective views of exemplary airborne base stations.
Figure 2A:
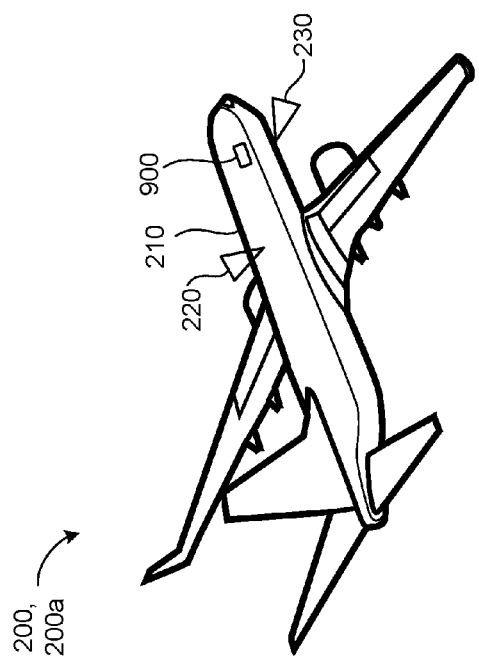

Referring to FIGS. 2A and 2B, in some implementations, an airborne base station 200 includes an airborne base station body 210 and a first antenna 220 disposed on the airborne base station body 210. The first antenna 220 receives a communication 20 from a satellite 300 and reroutes the communication 20 to a destination terrestrial terminal 110 via a second antenna 230 and vice versa. In some examples, the first and/or second antenna(s) 220,230 includes a phased array antenna system (e.g., tracking antenna). The airborne base station 200 may include a data processing device 900 that processes the received communication 20 and determines a path of the communication 20 to arrive at the destination terrestrial terminals 110b (e.g., user terminal). In some implementations, terrestrial terminals 110 on the ground have specialized antennas that send communication signals to the airborne base stations 200. The airborne base station 200 receiving the communication 20 sends the communication 20 to another airborne base station 200, to a satellite 300, or to another terrestrial terminal 110 (e.g., a terrestrial terminal 110b).

FIG. 2B illustrates an example communication balloon 200b that includes a balloon 204 (e.g., sized about 49 feet in width and 39 feet in height and filled with helium or hydrogen), an equipment box 206 as an airborne base station body 210, and solar panels 208. The equipment box 206 includes a data processing device 900 that executes algorithms to determine where the high-altitude balloon 200a needs to go, then each high-altitude balloon 200b moves into a layer of wind blowing in a direction that will take it where it should be going. The equipment box 206 also includes batteries to store power and a transceiver (e.g., antennas 220) to communicate with other devices (e.g., other airborne base stations 200, satellites 300, terrestrial terminals 110, such as terrestrial terminals 110b, internet antennas on the ground, etc.). The solar panels 208 may power the equipment box 206.

Communication balloons 200b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 200b float in the stratosphere at an altitude twice as high as airplanes and the weather (e.g., 20 km above the earth's surface). The high-altitude balloons 200a are carried around the earth 5 by winds and can be steered by rising or descending to an altitude with winds moving in the desired direction. Winds in the stratosphere are usually steady and move slowly at about 5 and 20 mph, and each layer of wind varies in direction and magnitude.

Figure 3:
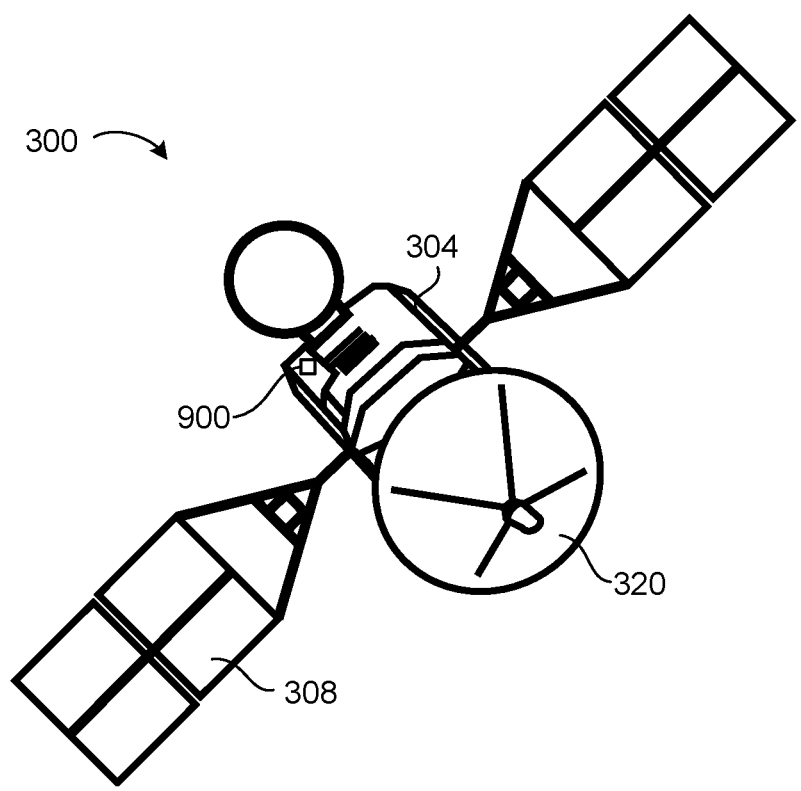
FIG. 3 is a perspective view of an exemplary satellite.

Referring to FIG. 3, a satellite 300 is an object placed into orbit 302 around the earth 5 and may serve different purposes, such as military or civilian observation satellites, communication satellites, navigations satellites, weather satellites, and research satellites. The orbit 302 of the satellite 300 varies depending in part on the purpose of the satellite 300. Satellite orbits 302 may be classified based on their altitude from the surface of the earth 5 as Low Earth Orbit (LEO), Medium Earth Orbit (MEO), and High Earth Orbit (HEO). LEO is a geocentric orbit (i.e., orbiting around the earth 5) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

In some implementations, the satellite 300 includes a satellite body 304 having a data processing device 900, e.g., similar to the data processing device 900 of the airborne base stations 200. The data processing device 900 executes algorithms to determine where the satellite 300 is heading. The satellite 300 also includes an antenna 320 for receiving and transmitting a communication 20. The satellite 300 may include solar panels 308 mounted on the satellite body 304 for providing power to the satellite 300. In some examples, the satellite 300 includes rechargeable batteries used when sunlight is not reaching and charging the solar panels 308.

When constructing a global-scale communications system 100 using airborne base stations 200, it is sometimes desirable to route traffic over long distances through the system 100 by linking airborne base stations 200 to satellites 300 and/or one airborne base station 200 to another. For example, two satellites 300 may communicate via inter-device links and two airborne base stations 200 may communicate via inter-device links. Inter-device link (IDL) eliminates or reduces the number of airborne base stations 200 or satellites 300 to terrestrial terminal 110 hops, which decreases the latency and increases the overall network capabilities. Inter-device links allow for communication traffic from one airborne base station 200 or satellite 300 covering a particular region to be seamlessly handed over to another airborne base station 200 or satellite 300 respectively. The airborne base station 200 or satellite 300 cover the same region. As such, a first airborne base station 200 or satellite 300 leaves the first area and a second airborne base station 200 or satellite 300 enters the area. Such inter-device linking is useful to provide communication services to areas away from a source at destination terrestrial terminals 110a, 110b and may also reduce latency and enhance security (fiber optic cables may be intercepted and data going through the cable may be retrieved). This type of inter-device communication is different than the "bent-pipe" model, in which all the signal traffic goes from a source terrestrial terminals 110a to a satellite 300, and then directly down to a destination terrestrial terminals 110b (e.g., terrestrial terminal) or vice versa. The "bent-pipe" model does not include any inter-device communications. Instead, the satellite 300 acts as a repeater. In some examples of "bent-pipe" models, the signal received by the satellite 300 is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, large-scale communication constellations are described in terms of a number of orbits 202, 302, and the number of airborne base stations 200 or satellites 300 per orbit 202, 302. Airborne base stations 200 or satellites 300 within the same orbit 202, 302 maintain the same position relative to their intra-orbit airborne base station 200 or satellite 300 neighbors. However, the position of an airborne base station 200 or a satellite 300 relative to neighbors in an adjacent orbit 202, 302 may vary over time. For example, in a large-scale satellite constellation with near-polar orbits, satellites 300 within the same orbit 302 (which corresponds roughly to a specific latitude, at a given point in time) maintain a roughly constant position relative to their intra-orbit neighbors (i.e., a forward and a rearward satellite 300). However, the satellites 300 within the same orbit 302 vary their position relative to neighbors in an adjacent orbit 302 varies over time. A similar concept applies to the airborne base stations 200; however, the airborne base stations 200 move about the earth 5 along a latitudinal plane and maintain roughly a constant position to a neighboring airborne base station 200.

A terrestrial terminal 110 may be used as a connector between satellites 300 and the Internet, or between airborne base stations 200 and terrestrial terminals 110. In some examples, the system 100 utilizes the terrestrial terminals 110 as linking-terrestrial terminals 110a for relaying a communication 20 from one airborne base station 200 or satellite 300 to another airborne base station 200 or satellite 300, where each airborne base station 200 or satellite 300 is in a different orbit 202, 302. For example, the linking-terrestrial terminal 110a may receive a communication 20 from an orbiting satellite 300, process the communication 20, and switch the communication 20 to another satellite 300 in a different orbit 302. Therefore, the combination of the satellites 300 and the linking-terrestrial terminals 110a provide a fully-connected system 100. For the purposes of further examples, the terrestrial terminals 110 (e.g., terrestrial terminal 110 and terrestrial terminals 110), shall be referred to as terrestrial terminals 110.

Figure 4:
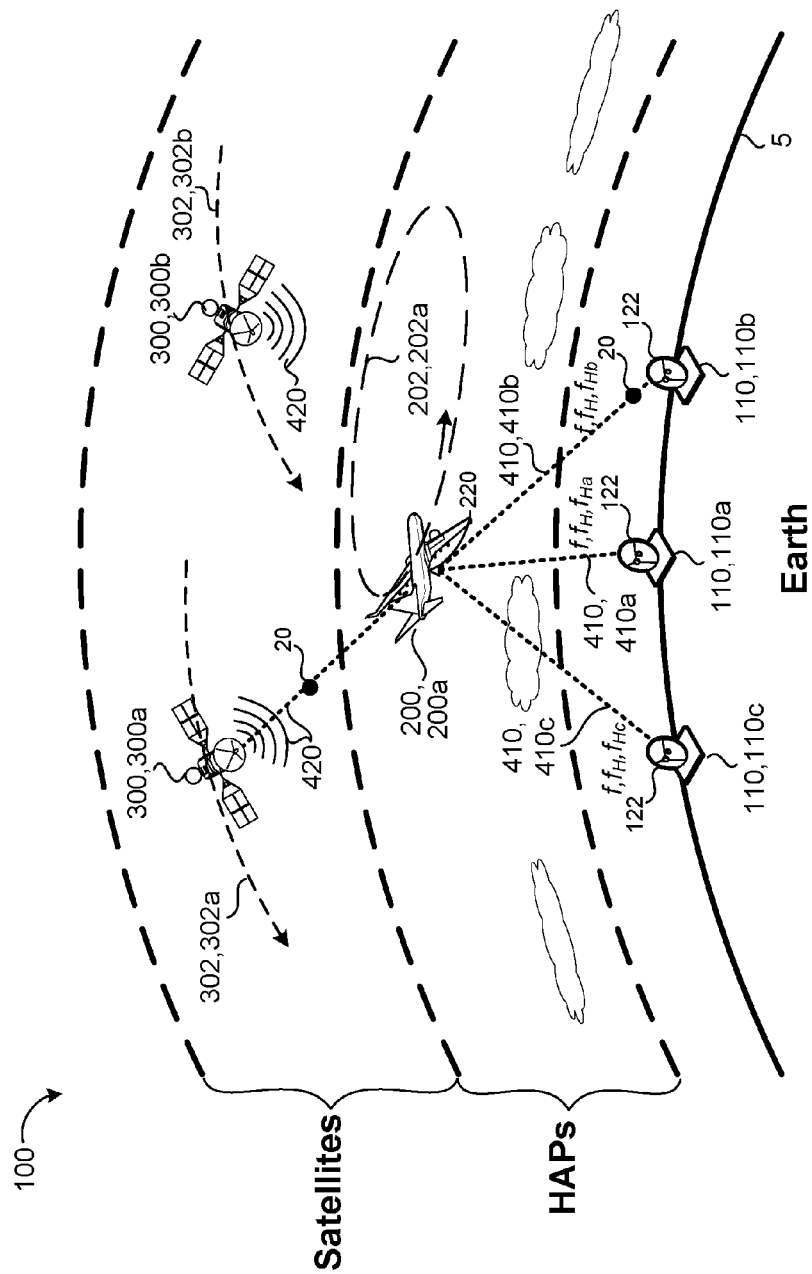
FIG. 4 is a schematic view of an exemplary communication system that includes an airborne base station and a terrestrial terminal.

FIG. 4 provides a schematic view of an exemplary architecture of a communication system 100 establishing a communications link via a communication beam 410 between an airborne base station 200 and a terrestrial terminal 110 (e.g., a ground station). In some examples, the airborne base station 200 is an unmanned aerial system (UAS). In the example shown, the airborne base station 200 includes one or more antennas 230 configured to project multiple communication beams 410 toward earth 5 for communication with one or more terrestrial terminals 110, 110a-n. In some implementations, the antenna 230 is a phased array antenna. Each communication beam 410 may include a communication 20 (e.g., data), which may be transmitted to/from the terrestrial terminal 110 (e.g., via radio signals or electromagnetic energy). Each communication beam 410 associated with the airborne base station 110 has a communication frequency $f_H$ associated with the communication beam 410 and is hereafter referred to as an airborne base station (ABS) communication beam 410, having a corresponding ABS communication beam pattern 412. The airborne base stations 200 may move about the earth 5 along a path, trajectory, or orbit 202 (also referred to as a plane, since their orbit or trajectory may approximately form a geometric plane).

The terrestrial terminal 110 includes a ground antenna 122 designed to communicate with the airborne base station 200. The airborne base station 200 may communicate various data and information to the terrestrial terminal 110, such as, but not limited to, airspeed, heading, attitude position, temperature, GPS (global positioning system) coordinates, wind conditions, flight plan information, fuel quantity, battery quantity, data received from other sources, data received from other antennas, sensor data, etc. The terrestrial terminal 110 may communicate to the airborne base station 200 various data and information including data to be forwarded to other terrestrial terminals 110 or to other data networks. Moreover, the airborne base station 200 may be various implementations of flying craft including a combination of the following such as, but not limited to an airplane, airship, helicopter, gyrocopter, blimp, multi-copter, glider, balloon, fixed wing, rotary wing, rotor aircraft, lifting body, heavier than air craft, lighter than air craft, etc.

In some implementations, the communication system 100 includes a satellite 300 having an antenna 320. The antenna 320 is configured to project multiple communication beams 420 toward the airborne base station 200 and the earth 5, for communication with one or more airborne base station 200 and optionally with the terrestrial terminal 110. The satellite 300 may be non-geostationary, i.e., the satellite 300 moves with respect to a point on earth 5. For example, the satellite 300 moves with respect to a terrestrial terminal 110 or a reference point 540. The satellites 300 may move along an orbit 302 around the earth 5 and may serve different purposes, such as military or civilian observation satellites, communication satellites, navigations satellites, weather satellites, and research satellites.

FIG. 5A is a perspective schematic view of an example airborne base station 200 operating over a given region of earth 5 to provide service to a given target area 550 of earth 5. The airborne base station 200 travels along a flight path 202, which may be roughly circular or have any closed or open shape. In the example shown, the flight path 202 has a diameter 212 measured across two points of the flight path 202. In some examples, the airborne base station 200 maintains a majority of line-of-sight to the terrestrial terminal 110. In other examples, the diameter 212 of the flight path 202 is less than a diameter of the earth 5 preventing gravitational based orbits. The airborne base station 200 and the flight path 202 may be fully enclosed in the atmosphere of the earth 5. As the airborne base station 200 moves along the flight path 202, the airborne base station 200 transmits ABS communication beams 410 to various terrestrial terminals 110. Each ABS communication beam 410 of the airborne base station 200 includes an ABS communication beam pattern 412, which defines an area in which the communication link using the ABS communication beam 410 between the terrestrial terminal 110 and airborne base station 200 exists. The ABS communication beam patterns 412, 412a-c may be any shape, may be separate, or may overlap each other. The ABS communication beam patterns 412 may or may not have defined edges for a given region.

With continued reference to the example shown in FIG. 5A, as the airborne base station 200 travels counter-clockwise around the flight path 202, a first ABS communication beam 410, 410a of the airborne base station 200 with a first ABS communication beam pattern 412, 412a comes into contact with a first terrestrial terminal 110, 110a. The airborne base station 200 and the first terrestrial terminal 110a may communicate while the airborne base station 200 is in a position 520H and an orientation 530H that allows for the first ABS communication beam 410, 410a and the first ABS communication beam pattern 412, 412a to remain in contact with the first terrestrial terminal 110a. As the airborne base station 200 continues to move counter-clockwise around the flight path 202, a second ABS communication beam 410, 410b and a second ABS communication beam pattern 412, 412b of the airborne base station 200 come into contact with a second terrestrial terminal 110b. The second ABS communication beam pattern 412, 412b allows for communication between the second terrestrial terminal 110b and the airborne base station 200 using the second ABS communication beam 410, 410b while the second ABS communication beam pattern 412, 412b encompasses the second terrestrial terminal 110b. As the airborne base station 200 continues to move counter-clockwise around the flight path 202, a third ABS communication beam 410, 410c and a third ABS communication beam pattern 412, 412c of the airborne base station 200 comes into contact with a third terrestrial terminal 110c. The third ABS communication beam pattern 412, 412c allows for communication between the third terrestrial terminal 110c and the airborne base station 200 using the third ABS communication beam 410, 410c while the third ABS communication beam pattern 412, 412c encompasses the third terrestrial terminal 110c. In some examples, multiple ABS communication beam patterns 412 and ABS communication beams 410 of the airborne base station 200 overlap, allowing for the terrestrial terminal 110 to select between one of the ABS communication beams 410, 410a-c or have transmissions across multiple ABS communication beams 410.

As the airborne base station 200 flies along the flight path 202 while operating over a target area 550, the airborne base station 200 has a position 520H and an orientation 530H with respect to a reference point 540 at a given moment in time. In some examples, the reference point 540 is one of the terrestrial terminals 110. The terrestrial terminal 110 or airborne base station 200 may be in communication with data processing hardware 900 in order to process and receive the position 520H and orientation 530H of the airborne base station 200 as it moves about its flight path 202. Multiple data processing hardware 900 may be present, with separate units connected to the terrestrial terminal 110, and/or the airborne base station 200. In some examples, the data processing hardware 900 is separate and only in communication with both or either of the terrestrial terminal 110 or the airborne base station 200.

Figure 5B:
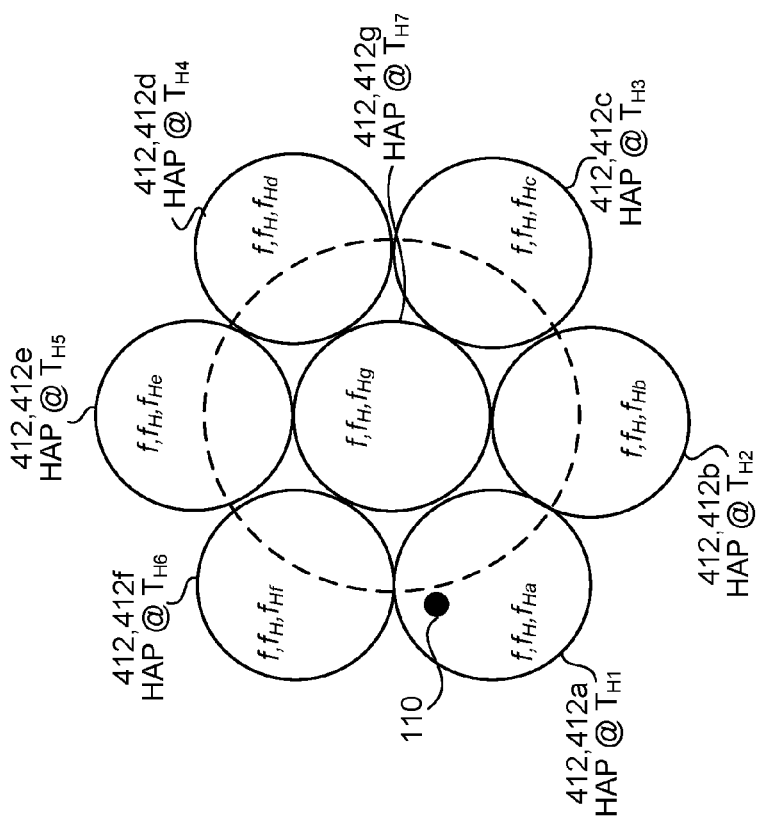
FIG. 5B is a top view of an exemplary pattern of communication beams projected from an airborne base station on terrestrial ground terminals.

FIG. 5B is a top view of exemplary ABS communication beam patterns 412 of ABS communication beams 410 projected from an antenna 230 of an airborne base station 200. The pattern of ABS communication beams 410 includes seven ABS communication beams 410, 410a-410g, each creating their own ABS communication beam pattern 412, 412a-412g at a different time $T_{H1}$-$T_{H2}$. A first ABS communication beam pattern 412, 412a at a first time $T_{H1}$, a second ABS communication beam pattern 412, 412b at a second time $T_{H2}$, a third ABS communication beam pattern 412, 412c at a third time $T_{H3}$, a fourth ABS communication beam pattern 412, 412d at a fourth time $T_{H4}$, a fifth ABS communication beam pattern 412, 412e at a fifth time $T_{H5}$, and a sixth ABS communication beam pattern 412, 412f at a sixth time $T_{H6}$ surround a seventh ABS communication beam pattern 412, 412g at a seventh time $T_{H7}$. As the airborne base station 200 operates in its flight path 202 and its position 520H changes with respect to time $T_{H1}$-$T_{H2}$, the respective position of the ABS communication beams 410, 410a-410g and the ABS communication beam patterns 412, 412a-412g appear to rotate and move in relation to the terrestrial terminal 110 on the ground. As the airborne base station 200 operates in its flight path 202 and the orientation 530H changes, the respective shape of the ABS communication beams 410, 410a-410g and the ABS communication beam patterns 412, 412a-412g appear to distort and move in relation to the terrestrial terminal 110 on the ground. As the airborne base station 200 continues to operate in a predictable manner patrolling its orbit over its target area 550, the motion and shape of the ABS communication beams 410, 410a-410g and the ABS communication beam patterns 412, 412a-412g may become more regular and predictable. There is no limit to the number of ABS communication beams 410 and ABS communication beam patterns 412 that may be projected from the airborne base station 200. The airborne base station 200 and the terrestrial terminals 110, 110a-n are in communication with a scheduler 560 that determines a communication frequency f, $f_{Ha-g}$ associated with each of the ABS communication beams 410 for a duration of time so as to not interfere with other frequency band users, such as the satellites 300 using the frequency band. In some examples, the airborne base station 200 sends the scheduler 560 information including the communication frequency f, $f_{Ha-g}$ of an ABS communication beam 410 that the airborne base station 200 is using.

FIG. 5C is a perspective schematic view of an example operating satellite 300. The satellite 300 may be operating over a given region of earth 5 and provides service to a given target area 550 of earth 5. The satellite 300 may travel along an orbit 302. The orbit 302 may be roughly circular, but may include any closed or open shape. The orbit 302 may be around the earth 5. In some examples, the satellite 300 maintains a line-of-sight to the terrestrial terminal 110 within a portion of its satellite orbit 302. In other examples, a diameter of the satellite orbit 302 is greater than a diameter of the earth 5. As the satellite 300 moves along the orbit 302, the satellite 300 may transmit communications beams 420 to various terrestrial terminals 110 and/or airborne base stations 200. Since the satellite 300 can serve different purposes, such as military or civilian observation satellites, communication satellites, navigations satellites, weather satellites, and research satellites, the satellite 300 may or may not be configured to communicate with terrestrial terminals 110 and/or airborne base stations 200. In addition, the satellite 300 may be configured to communicate with only certain terrestrial terminals 110 and/or airborne base stations 200. In examples, where the satellite 300 does not communicate with the terrestrial terminals 110 or at times when the satellite 300 is not communicating with a given terrestrial terminal 110, the terrestrial terminal(s) 110 listens to the satellite communication beams 420 to identify a frequency f, $f_S$ of the communication beams 420. In some examples, the terrestrial terminal 110 checks multiple frequencies within a frequency band to determine which frequency is being used by the satellite 300. Furthermore, in some examples, the terrestrial terminal 110 measures a signal power at each frequency (i.e., at each target frequency) to determine the frequency f, $f_S$ that is being used by the satellite 300.

Each satellite communication beam 420 may include a satellite communication beam pattern 422, which defines an area in which the communication link using the satellite communication beam 420 between a terrestrial terminal 110 and/or an airborne base station 200 and satellite 300 exists. The satellite communication beam patterns 422 may be any shape and may be separate or they may overlap each other. The communication beam patterns 422 may not have defined edges or be a given region. For example, as the satellite 300 travels about the satellite orbit 302, a first satellite communication beam 420, 420a with a first satellite communication beam pattern 422, 422a comes into contact with the first terrestrial terminal 110a and/or the airborne base station 200 at a first time $T_{S1}$. The satellite 300 and the terrestrial terminal 110 and/or the airborne base station 200 may communicate while the satellite 300 is in a position 520S and an orientation 530S to allow for the first satellite communication beam 420, 420a and the first satellite communication beam pattern 422, 422a to remain in contact with the first terrestrial terminal 110a and/or the airborne base station 200. As the satellite 300 continues to move about the satellite orbit 302, at a second time $T_{S2}$, a second satellite communication beam 420, 420b and a second satellite communication beam pattern 422, 422b comes into contact with a second terrestrial terminal 110b (e.g., a user device), allowing for communication between the second terrestrial terminal 110b (e.g., the user device) and the satellite 300 using the second satellite communication beam 420, 420b. The second satellite communication beam pattern 422, 422b encompasses the second terrestrial terminal 110b (e.g., the user device). As the satellite 300 continues to move about the satellite orbit 302, a third satellite communication beam 420, 420c and a third satellite communication beam pattern 422, 422c comes into contact with a third terrestrial terminal 110c. In this example, the third terrestrial terminal 110c is not configured to communicate with the satellite 300; therefore, the third terrestrial terminal 110c listens to the third satellite communication beam 420, 420c to determine a frequency f, $f_{Sc}$ associated with the third satellite communication beam pattern 422, 420c at the corresponding location (i.e., at position 520S and orientation 530S) of the satellite 300. The third satellite communication beam pattern 422, 422c encompasses the third terrestrial terminal 110c. As such, the scheduler 560 determines a pattern of frequency usage by the satellite 300 at the corresponding location 520S, 530S of the satellite 300 based on listening to the satellite frequency f, $f_S$ over a period of time (e.g., days, weeks, months) and identifying the pattern of frequency usage by the satellite 300. In some examples, multiple satellite communication beam patterns 422 and satellite communication beams 420 overlap, allowing for the terrestrial terminal 110 or satellite 300 to select between one of the satellite communication beams 420 or have transmissions across multiple satellite communication beams 420.

As the satellite 300 moves along the satellite orbit 302 while operating over a target area 550, the satellite 300 has a position 520S and an orientation 530S with respect to a reference point 540 at a given moment in time. The terrestrial terminal 110 or satellite 300 may be in communication with data processing hardware 900 in order to process and receive the position 520S and orientation 530S of the satellite 300. In some examples, the data processing hardware 900 is separate and only in communication with both or either of the terrestrial terminal 110 or the satellite 300.

Figure 5D:
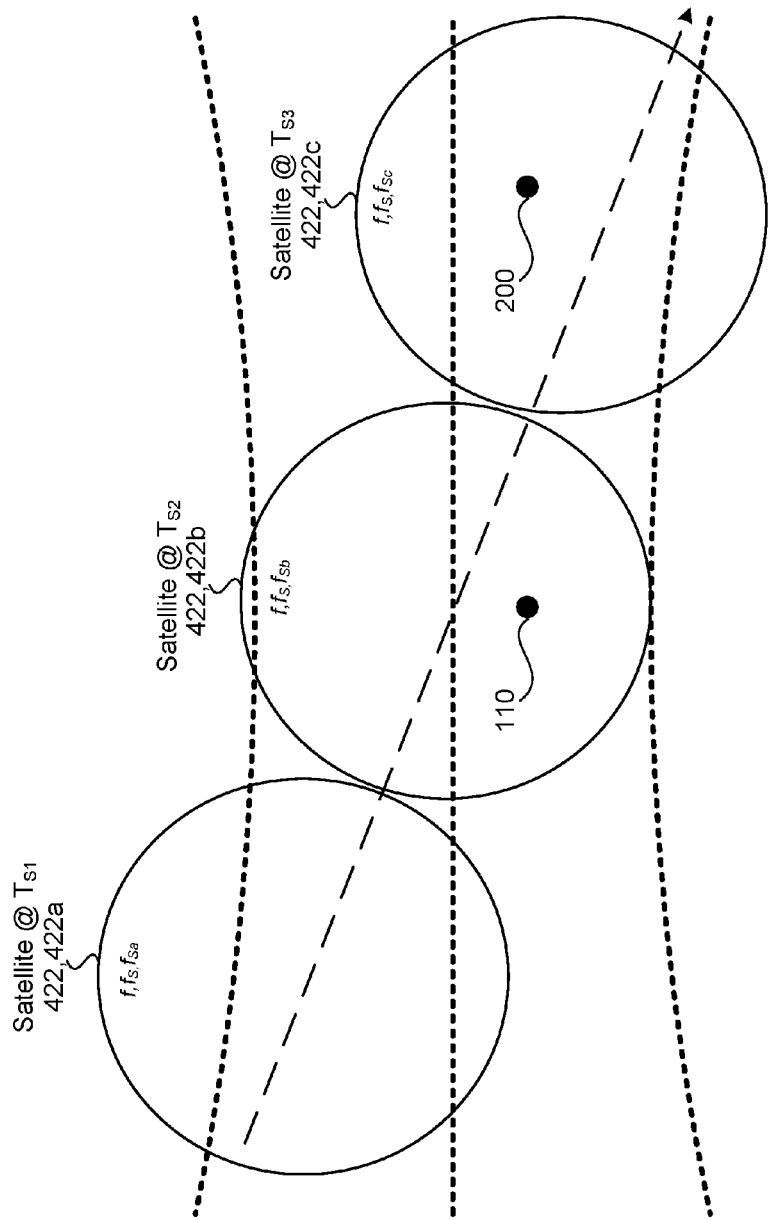
FIG. 5D is a top view of an exemplary pattern of communication beams projected from a satellite on an airborne base station and terrestrial ground stations.

FIG. 5D is a top view of an exemplary beam pattern 422 of satellite communication beams 420 projected from an antenna 320 on a satellite 300. The pattern of satellite communication beams 420 includes three satellite communication beams 420, 420a-420c, each creating their own communication beam pattern 422, 422a-422c, a first satellite communication beam pattern 422, 422a, a second satellite communication beam pattern 422, 422b, and a third satellite communication beam pattern 422, 422c. As the satellite 300 operates in its satellite orbit 302 and its position 520S changes, the respective position of the satellite communication beams 420, 420a-420c and the satellite communication beam patterns 422, 422a-422c appear to rotate and move in relation to the terrestrial terminal 110 on the ground and/or the airborne base stations 200. As the satellite 300 operates in its satellite orbit 302 and its orientation 530S changes, the respective shape of the satellite communication beams 420, 420a-420g and the satellite communication beam patterns 420, 420a-420g appear to distort and move in relation to the terrestrial terminal 110 on the ground. As the satellite 300 continues to operate in a predictable manner patrolling its satellite orbit 302 over the target area 550, the motion and shape of the satellite communication beams 420, 420a-420c and the satellite communication beam patterns 420, 420a-420c may become more regular and predictable. There is no limit to the number of satellite communications beams 420 and satellite communication beam patterns 422 that may be projected from the satellite 300.

As discussed earlier, the scheduler 560 determines a communication frequency f, $f_{Ha-g}$ of an ABS communication beam 410 between a terrestrial terminal 110 and an airborne base station 200 for a duration of time so as to not interfere with other frequency band users, such as the satellite 300. Therefore, as the satellite 300 emits satellite communication beams 420, the communication frequency f, $f_{Ha-g}$ of the ABS communication beam 410 between the terrestrial terminal 110 and the airborne base station 200 does not interfere with the communication frequency f, $f_{Sa-n}$ of the satellite communication beam 420.

In some implementations, the satellite 300, the terrestrial terminals 110, 110a-n, and the airborne base station 200 are all in communication with the scheduler 560. In such implementations, the scheduler 560 may also determine a communication frequency f, $f_{Sa-n}$ of the satellite communication beam 420 for a duration of time so as to not interfere with other frequency band users, such as, for example, between the terrestrial terminals 110, 110a-n, and the airborne base station 200.

Figure 5F:
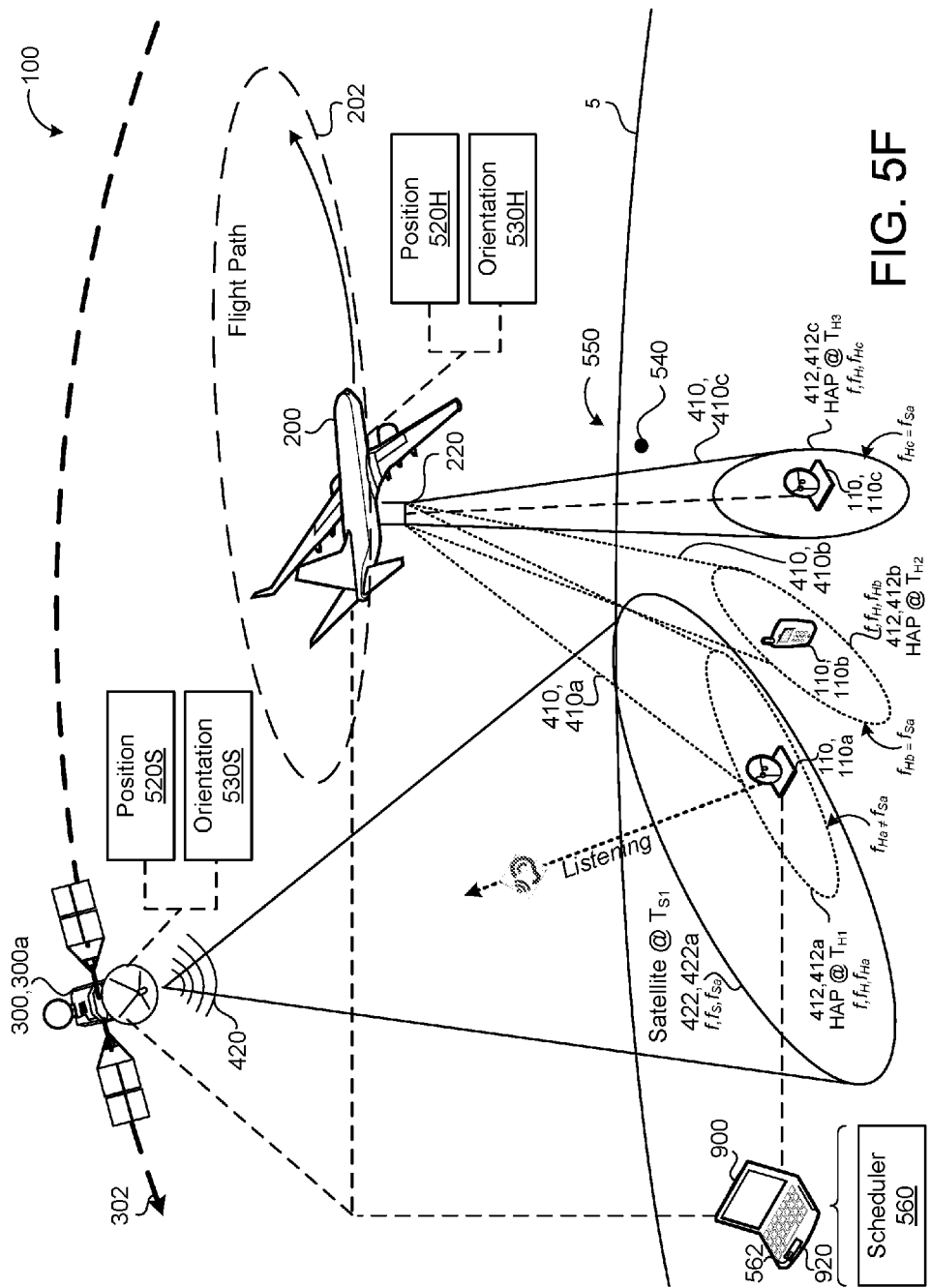

FIGS. 5E and 5F are perspective schematic views of an example communication system 100 including terrestrial terminals 110, an airborne base station 200, and a satellite 300. The airborne base station 200 and the satellite 300 are shown operating over a given region of earth 5 to provide service to the given target area 550 of the earth 5. The airborne base station 200 travels along the corresponding flight path 202; while the satellite 300 travels about the corresponding satellite orbit 302. As the airborne base station 200 moves along the flight path 202, the airborne base station 200 transmits ABS communication beams 420 to various terrestrial terminals 110. In addition, as the satellite 300 travels about the satellite orbit 302, the satellite 300 transmits satellite communication beams 420 to the airborne base station 200 and/or the terrestrial terminals 110. Each communication beam 410, 420, i.e., ABS communication beam 410 and satellite communication beam 420, may include a corresponding beam pattern 412, 422, i.e., an ABS communication beam pattern 412 and a satellite communication beam pattern 422.

In some implementations, the ABS communication beam 410 and the satellite communication beam 420 interfere with one another when the airborne base station 200 and the satellite 300 transmit corresponding communication beams 410, 420 having overlapping communication beam patterns 412, 422 with one another and having an interfering frequency f (e.g., the same frequency). Therefore, the scheduler 560 receives information from the terrestrial terminal 110, the airborne base station 200, and/or the satellite 300 and optionally stores the information on non-transitory memory 920 in communication with the data processing hardware 900 executing the scheduler 560. Based on the received information, the scheduler 560 determines a pattern of frequency usage by the satellite(s) 300 at corresponding satellite locations (e.g., position 520S and orientation 530S) as shown in FIG. 5H. In addition, the scheduler 560 may also determine a pattern of frequency usage by the airborne base station(s) at corresponding airborne base station 200 locations, i.e., position 520H, and orientation 530H. In some examples, the airborne base station 200 travels counter-clockwise around the flight path 202, while the satellite 300 travels around the earth 5 in the satellite orbit 302. The satellite beam pattern 422,422a and the ABS beam pattern 412, 412a may overlap.

Referring to the example shown in FIG. 5E, in some implementations, as the satellite 300 orbits the earth 5 in the satellite orbit 302, the satellite 300 transmits a first satellite communication beam pattern 422a at a first satellite time $T_{S1}$. At a second satellite time (not shown), a second satellite communication beam pattern 422 is at a different location from the first satellite communication beam pattern 422a. In some examples, the first and second satellite beam patterns 422 overlap. Meanwhile, an airborne base station 200 is flying about its flight path 202. At a first ABS time $T_{H1}$, a first ABS communication beam pattern 412a overlaps with the first satellite communication beam pattern 422a. As the airborne base station 200 moves along its flight path 202 at a second ABS time $T_{S2}$, the airborne base station 200 transmits a second ABS communication beam 410 having a second ABS communication beam pattern 412b that does not overlap with the first satellite communication beam pattern 422a. As the airborne base station 200 moves along its flight path 202, the first ABS communication beam pattern 412a no longer overlaps with the first satellite communication beam pattern 422a (as shown in FIG. 5F).

With continued reference to both FIGS. 5E and 5F, in some examples, a first terrestrial terminal 110a is configured to communicate with the airborne base station 200. When the airborne base station 200 is transmitting the first ABS communication beam 410, 410a, the first ABS communication beam pattern 412, 412a envelops the first terrestrial terminal 110a, and the first terrestrial terminal 110a communicates with the airborne base station 200. However, as shown in FIG. 5F, when the airborne beam station 200 proceeds along its flight path 202 and the first ABS communication beam 410a no longer envelops the first terrestrial terminal 110a or the airborne beam station 200 ceases communication with the first terrestrial terminal 110a, the first terrestrial terminal 110a directs its antenna 112 towards the satellite 300 and listens to the satellite 300. The first terrestrial terminal 110a listens to the satellite 300 to identify one or more satellite frequencies $f_S$ that the satellite 300 is using to transmit/receive communications 20 from a corresponding location 520A, 530S and sends the satellite frequencies $f_S$ and corresponding location 520A, 530S (collectively referred to as satellite information) to the scheduler 560. The scheduler 560 optionally stores the satellite information and determines a pattern of frequency usage by the satellite 300. Since the satellite 300 travels the orbit 302 in a periodic manner, i.e., revisits the same location at a specific interval of time, the scheduler 560 can learn the communication patterns of the satellite 300. Moreover, the scheduler 560 may aggregate satellite information from many listening terrestrial terminals 110, process the aggregated satellite information, and identify a pattern of frequency usage by each observed satellite 300. Furthermore, the scheduler 560 may also identify a pattern of frequency usage by the airborne base stations 200. Based on the pattern of frequency usage by the satellite 300 and/or the airborne base stations 200, the scheduler 560 can instruct communication between the terrestrial terminals 110 and the airborne base stations 200 to use an identified satellite communication frequency f, $f_{Sa-n}$ during a non-interfering period of time. The non-interfering period of time is a period of time when an ABS communication beam 410 of the airborne base station 200 has an ABS beam frequency $f_H$ that does not interfere with a satellite communication beam frequency $f_S$.

In some implementations, the scheduler 560 predicts potential communication interferences between the ABS communication beams 410 and the satellite communication beam 420 based on a satellite map 562 containing the pattern of frequency usage stored on the non-transitory memory 920. The scheduler 560 may generate the satellite map 562 based on the satellite information received from the terrestrial terminals 110, while in other examples, the satellites 300 or a system associated with the satellites 300 transmit the satellite map 562 to the schedule 560. The satellite map may include a satellite location 520A, 530S of the satellite 300, and for each satellite location 520A, 530S, at least one of a satellite communication frequency $f_S$ or a communication signal power of the satellite 300.

Based on the patterns of frequency usage of the airborne base station 200 and/or the satellite 300, the scheduler 560 modifies a communication frequency $f_H$ or an activation of any ABS communication beams 410 of the antenna 122 of the terrestrial terminal 110 so as to not interfere with the one or more satellite communication frequencies $f_S$ used by the satellite 300. In other words, and with reference to FIG. 5E, the scheduler 560 instructs the first terrestrial terminal 110a to communicate with the airborne base station 200 over a first airborne frequency $f_{Ha}$ that is different than the satellite communication frequency $f_{Sa}$. In some examples, the satellite 300 is transmitting the satellite communication beam 420, 420a having the corresponding communication beam pattern 422, 422a and the satellite communication beam frequency $f_{Sa}$ while the airborne base station 200 is also transmitting an ABS communication beam 410,410a having the corresponding ABS communication beam pattern 412a. In this example, both communication beam patterns 412a, 422a include the terrestrial terminals 110a. As such, the scheduler 560 instructs the terrestrial terminal 110a (and sometimes the airborne base station 200) to communicate over a frequency $f_{Ha}$ different from the satellite communication beam frequency $f_{Sa}$. However, when the ABS communication beam pattern 412a of the airborne base station 200 no longer overlaps with the satellite communication beam pattern 422a, the airborne base station 200 may communicate with the terrestrial terminal 110 at a frequency $f_H$, $f_{Hb}$, $f_{Hc}$ that is the same as the satellite communication beam frequency $f_{Sa}$. Moreover, while the first terrestrial terminal 110a cannot use a frequency f that is the same as the satellite communication beam frequency $f_{Sa}$ during an interfering period of time, second and third terrestrial terminals 110a, 110b may use a communication frequency $f_{Hb}$, $f_{Hc}$ that is the same as the satellite communication beam frequency $f_{Sa}$ at non-interfering periods of time.

Figure 5G:
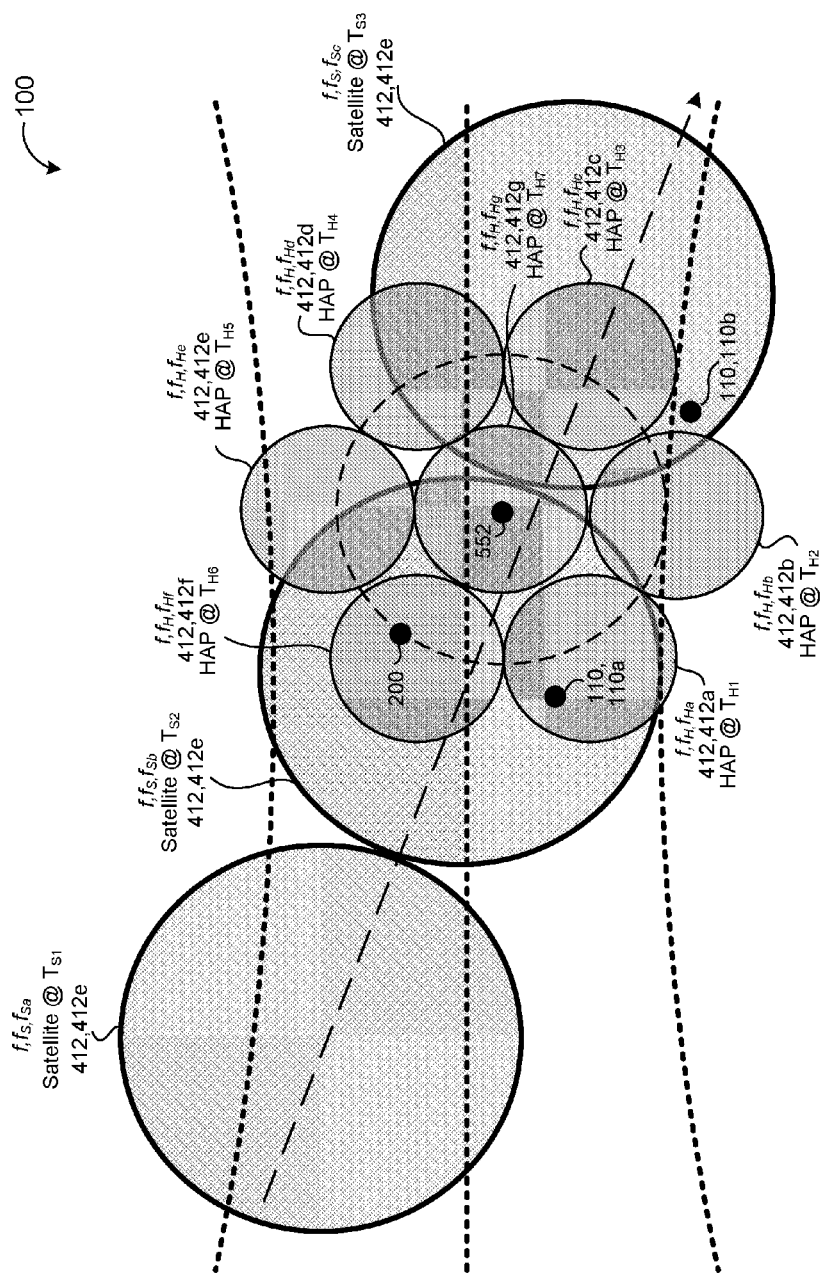
FIG. 5G is a top view of an exemplary pattern of communication beams projected from a satellite and an airborne base station on terrestrial ground stations.
Figure 5H:
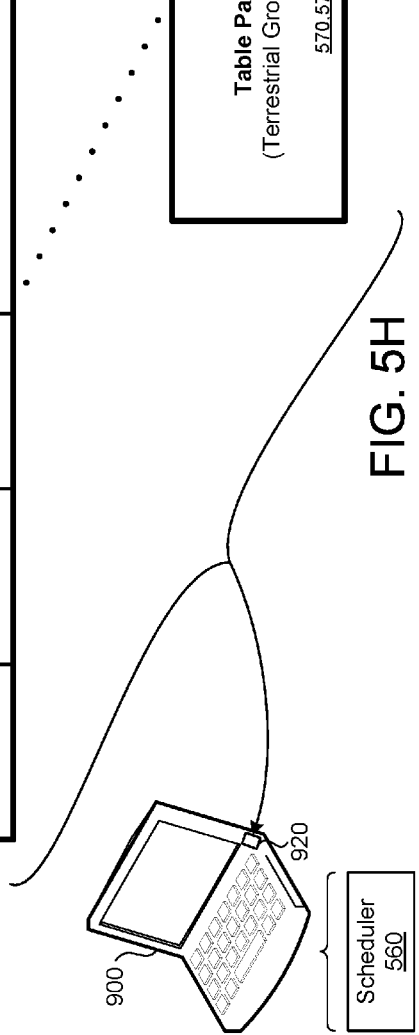
FIG. 5H is a schematic view of an exemplary communication table of frequency pattern usage of a terminal ground station.

FIG. 5G is a top view of the exemplary beam pattern 412 of communication beams 410 projected from the antenna 230 of the airborne base station 200, as shown in FIG. 5B, and the exemplary satellite communication beam patterns 422 of satellite communication beams 420 projected from the antenna 320 of the satellite 300, as shown in FIG. 5D. Similar to FIG. 5B, the pattern of the ABS communication beams 410 includes seven ABS communication beams 410, 410a-410g, each creating their own ABS communication beam pattern 412, 412a-412g. Also, similar to FIG. 5D, the pattern of satellite communication beams 420 includes three satellite communication beams 420, 420a-420c, each creating their own satellite communication beam pattern 422, 422a-422c. At a first satellite time $T_{S1}$, a first satellite communication beam 420a has a first satellite frequency $f_{Sa}$ and a corresponding first satellite communication beam pattern 422a that does not yet envelop first and second terrestrial terminals 110a, 110b and the airborne base station 200.

At a second satellite time $T_{S2}$, a second satellite communication beam 420b has a second satellite frequency $f_{Sb}$ and a corresponding second satellite communication beam pattern 422b that envelops the first terrestrial terminal 110a and the airborne base station 200, but not the second terrestrial terminal 110b. Since a first communication beam pattern 412a of a first ABS communication beam 410a overlaps with the second satellite communication beam pattern 422b of the second satellite communication beam 420b, the scheduler 560 instructs the terrestrial terminal 110a or the airborne base station 200 to use a corresponding first communication frequency f, $f_{Ha}$ that is different than the second satellite frequency $f_{Sb}$ of the second satellite communication beam 420b. Therefore, the first terrestrial terminal 110a can communicate with the airborne base station 200 without interfering with the second satellite communication beam 420b.

At a third satellite time $T_{S3}$, a third satellite communication beam 420c has a third satellite frequency $f_{Sc}$ and a corresponding third satellite communication beam pattern 422c that envelops the second terrestrial terminal 110b, but not the first terrestrial terminal 110a and the airborne base station 200. In this example, the satellite 300 is not communicating with the second terrestrial terminal 110b, so the second terrestrial terminal 110b listens to the satellite 300 at the third satellite time $T_{S3}$ and sends satellite information to the scheduler 560 to maintain an up-to-date pattern of frequency usage by the satellite 300 and/or the airborne base station 200. As mentioned earlier, the satellite information may include satellite frequencies $f_S$ at corresponding satellite locations (e.g., position 520S and orientation 530S).

FIG. 5H illustrates an exemplary communication table 570 of frequency pattern usage based on satellite information received by the scheduler 560 from one or more of the terrestrial terminals 110, the airborne base stations 200, and/or the satellites 300. The scheduler 560 executes on data processing hardware 900 in communication with non-transitory memory 920. The non-transitory memory 920 stores accumulated information allowing the data processing hardware 900 to identify the pattern of frequency usage by satellites 300. As shown, the pattern of frequency usage table 570 is associated with a satellite 300; however, a pattern of frequency usage table 570 associated with the airborne base stations 200 is possible as well. The scheduler 560 may store the received satellite information in the form of a table having rows and columns, where the rows define a time and the columns define a satellite. Each row and column forms a cell that identifies a location (e.g., position 520S and orientation 530S) and satellite frequency $f_S$ associated with each satellite 300. As such, the scheduler 560 can accumulate time, location, and satellite frequency $f_S$ information for each satellite 300 and after a period of time, identify patterns of frequency usage associated with each satellite 300. The scheduler 560 may include a table of frequency usage associated with each terrestrial terminal 110. While a communication table 570 is shown, other implementations are possible as well, such key-value pair data stores, databases, and the like.

Figure 6A:
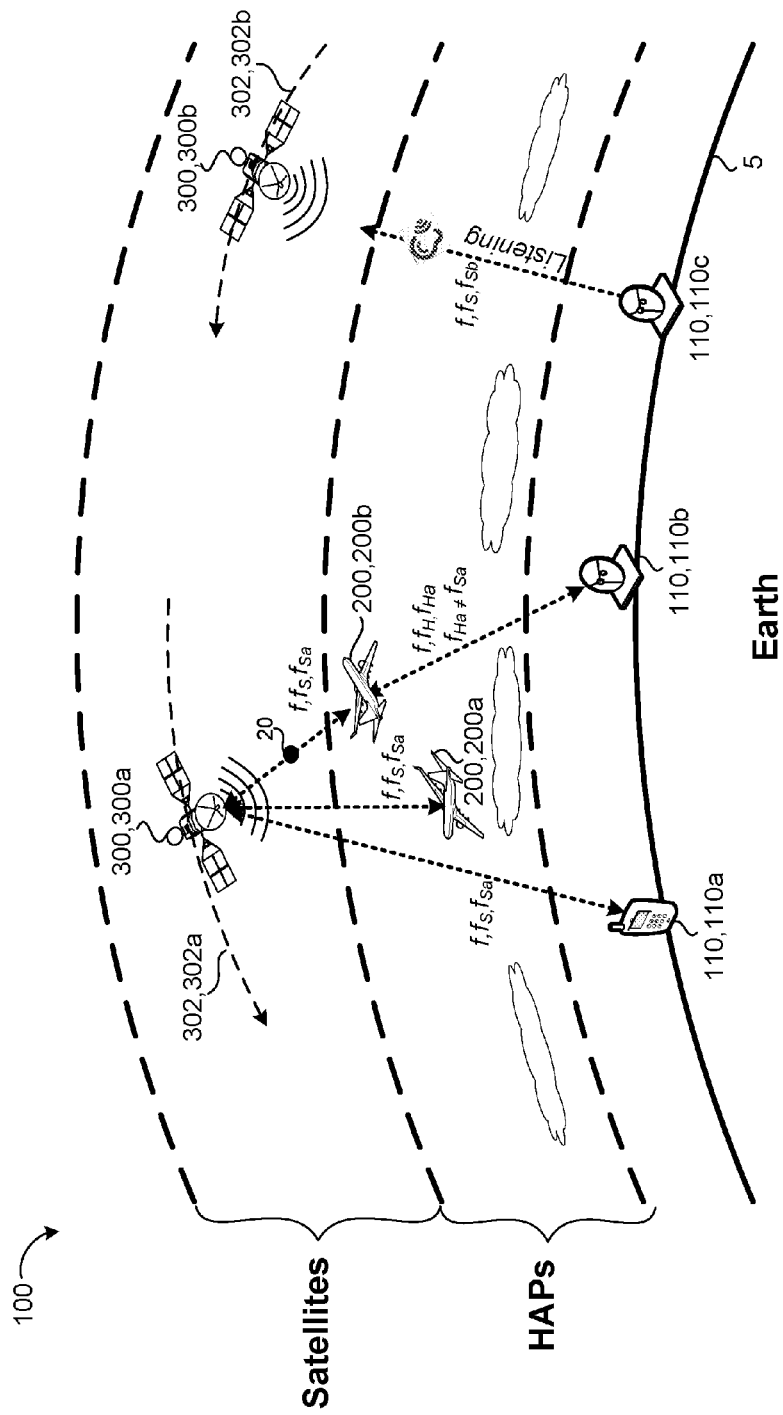
FIGS. 6A-6C are schematic views of an exemplary communication system that includes an airborne base station and a terrestrial terminal.
Figure 6B:
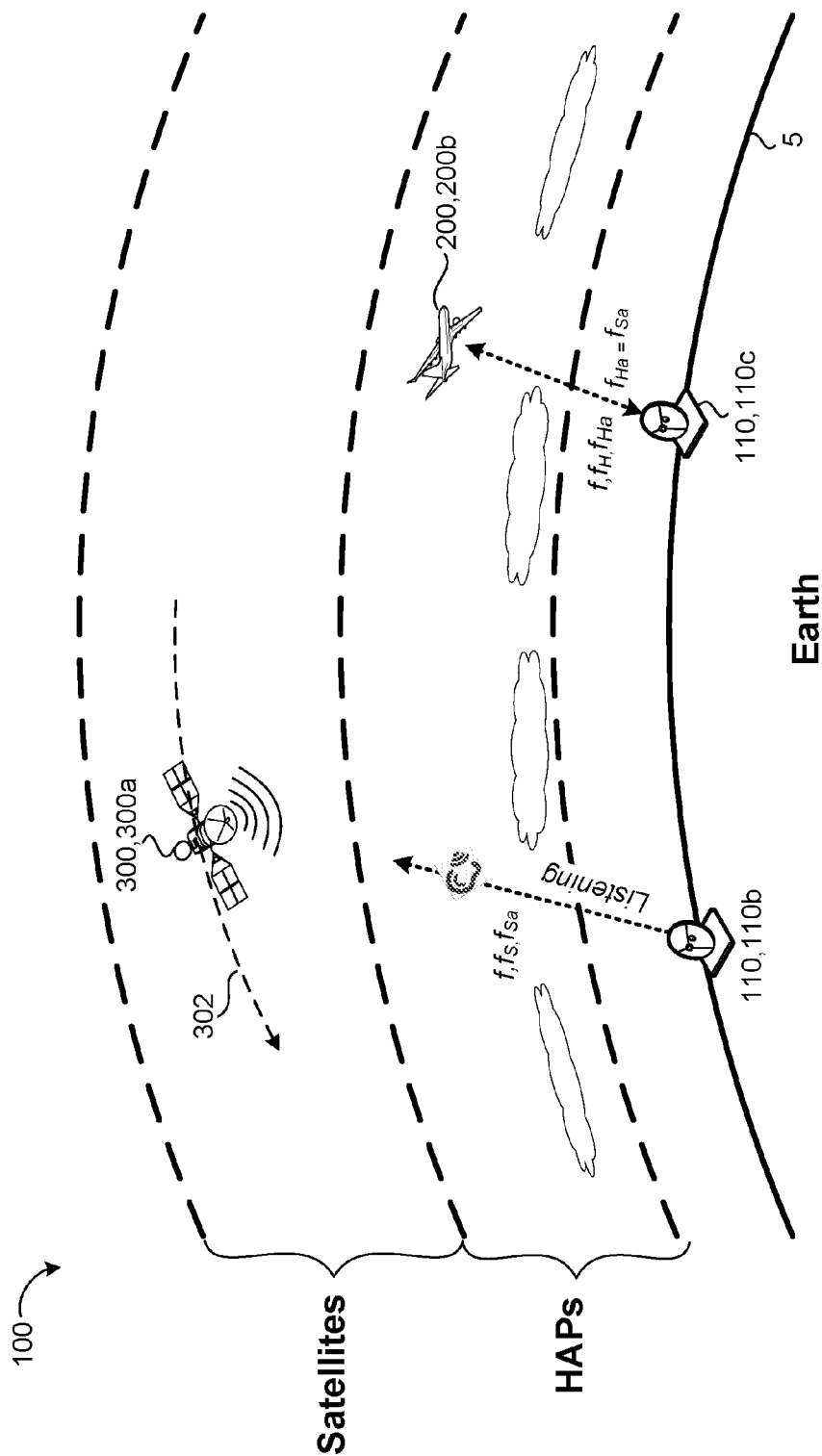
Figure 6C:
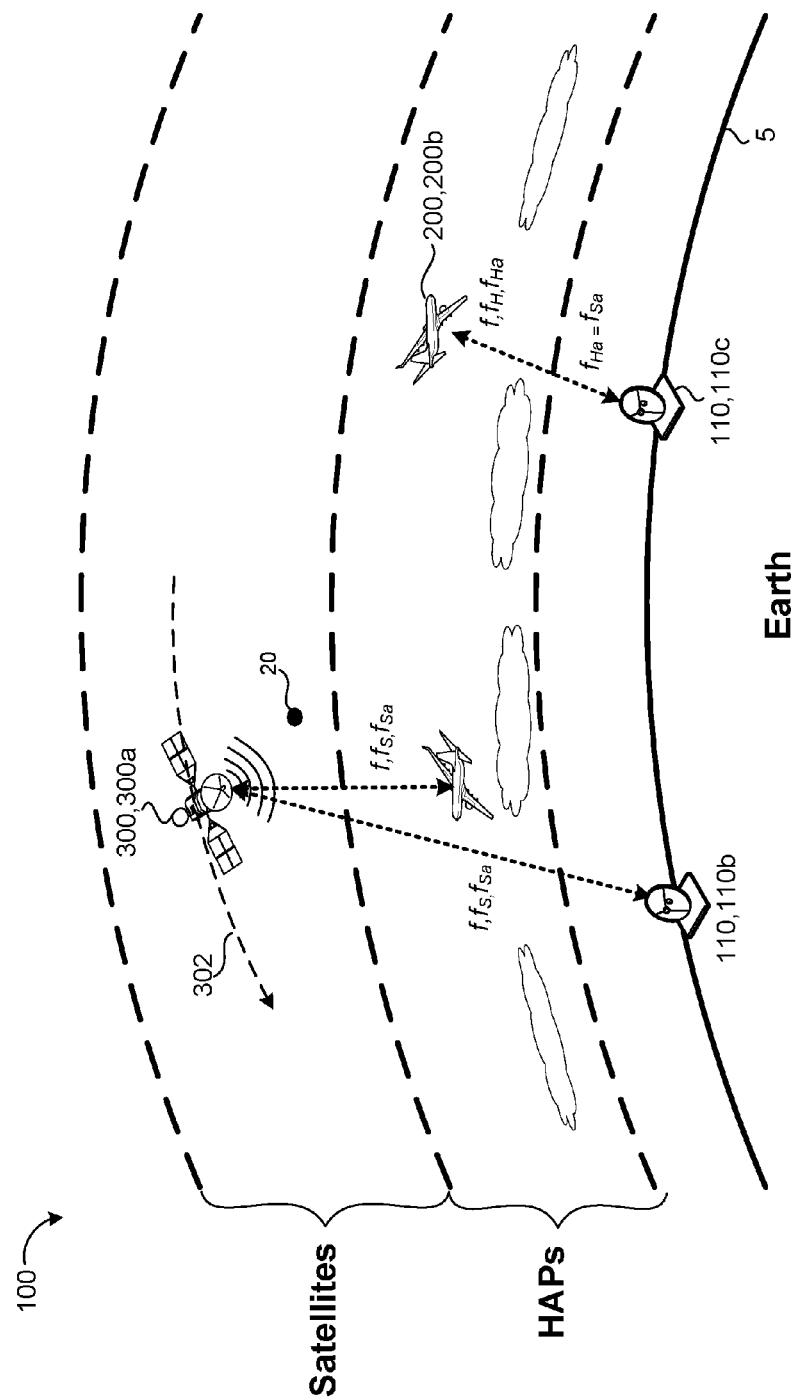

FIGS. 6A-6C illustrate example communication systems 100 that include satellite(s) 300, airborne base station(s) 200, and terrestrial terminal(s) 110. In the example shown in FIG. 6A, the communication system 100 includes a first terrestrial terminal 110a being a user device in communication with a first satellite 300a. The communication system 100 also includes first and second airborne base stations 200a, 200a, 200b in communication with the first satellite 300a. The communication system 100 includes a second satellite 300b that is not within a line-of-sight of the first and second terrestrial terminals 110a, 110b or the first and second airborne base stations 200a, 200b. The first satellite 300a communicates with the first terrestrial terminal 110a, the first airborne base station 200a, and the second airborne base station 200b using a first satellite frequency f, $f_S$, $f_{Sa}$; while the second terrestrial terminal 110b communicates with the second airborne base station 200b using an airborne frequency f, $f_H$, $f_{Ha}$ that is not the same as the first satellite frequency f, $f_S$, $f_{Sa}$. As shown, the second terrestrial terminal 110b is in the shadow of the second airborne base station 200b, which is in communication with the first satellite 300a using the first satellite frequency f, $f_S$, $f_{Sa}$. Therefore, to avoid interference with the first satellite 300a, the second terrestrial terminal 110b and the second airborne base stations 200b do not use a frequency, i.e., an ABS frequency f, $f_H$, $f_{Ha}$ that is the same as the first satellite frequency f, $f_S$, $f_{Sa}$. In this case, the scheduler 560, which identifies a pattern of frequency usage of the first satellite 300a, instructs the second terrestrial terminal 110b to use an ABS frequency f, $f_H$, $f_{Ha}$ that is different from the first satellite frequency f, $f_S$, $f_{Sa}$ ($f_{Ha} \neq f_{Sa}$). However, when the second airborne base station 200b moves away and is no longer communicating with the second terrestrial terminal 110b, as in the example shown in FIG. 6B, the second terrestrial terminal 110b is no longer in the shadow of the second airborne base station 200b and becomes in a line-of-sight with the first satellite 300a. During this time the second terrestrial terminal 110b can listen to the first satellite 300a to identify satellite frequencies f, $f_S$, used by the first satellite 300a to update or generate the pattern of frequency usage by the satellite 300.

In the example shown in FIG. 6C, when the second and third terrestrial terminals 110b, 110c are far apart and the second terrestrial terminal 110b is in communication with (or listening to) the first satellite 300a, the third terrestrial terminal 110c can use an ABS frequency f, $f_H$, $f_{Ha}$ to communicate with an airborne base station 200b that is the same the satellite frequency f, $f_S$, $f_{Sa}$ that the second terrestrial terminal 110a is using to communicate (or is listening to) with the first satellite 300a.

Figure 7:
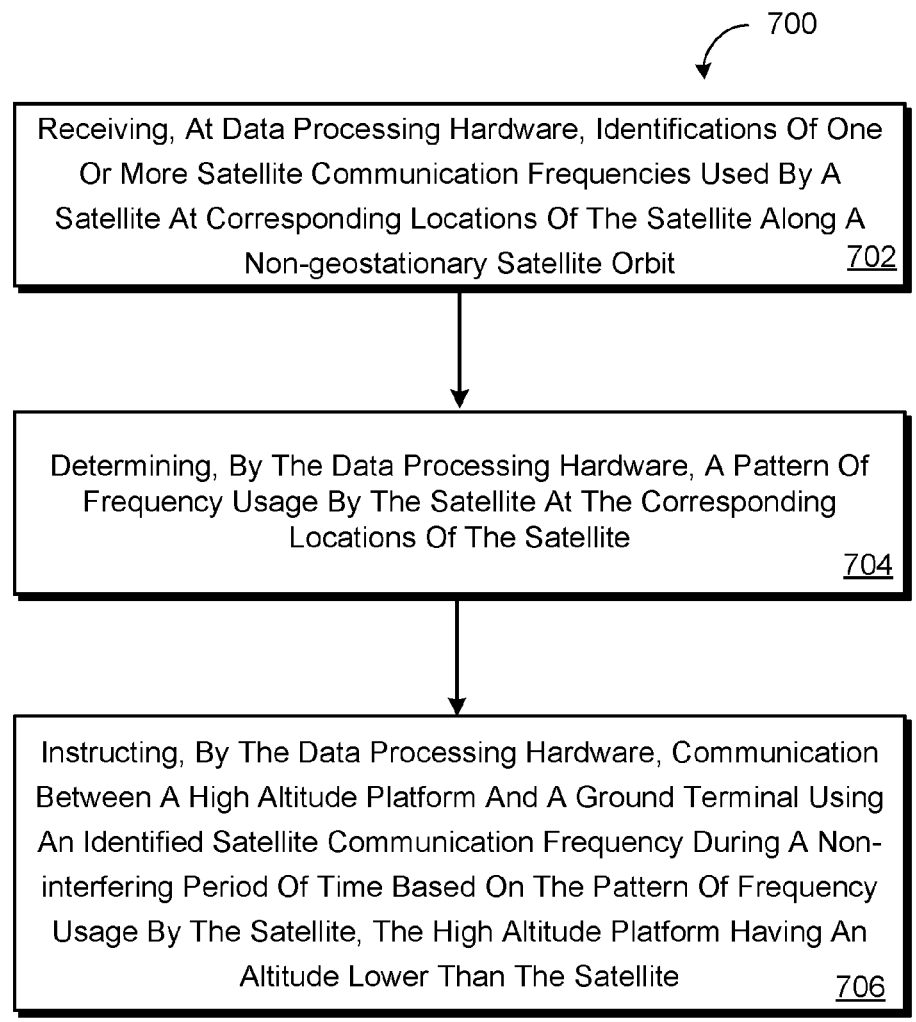
FIG. 7 provides an exemplary arrangement of operations for a method of selecting an identified satellite communication frequency for use between a terminal ground station and an airborne base station based on a pattern of frequency usage by a satellite associated with the identified satellite communication frequency.

FIG. 7 illustrates a method 700 of selecting an identified satellite communication frequency $f_S$ for use between a terminal terrestrial terminal 110 and an airborne base station 200 based on a pattern of frequency usage (e.g., the communication table 570) by a satellite 300 associated with the identified satellite communication frequency $f_S$. At block 702, the method 700 includes receiving, at data processing hardware 900 (e.g., executing a scheduler 560) identifications of one or more satellite communication frequencies $f_S$ used by a satellite 300 at corresponding locations (e.g., location 520S and/or orientation 530H) of the satellite 300 along a non-geostationary satellite orbit 302. At block 704, the method 700 includes determining, by the data processing hardware 900, a pattern of frequency usage by the satellite 300 at the corresponding locations of the satellite 300. At block 706, the method 700 includes instructing, by the data processing hardware 900, communication between a high altitude platform 200 (e.g., an airborne base station 200) and a terrestrial terminal 110 using an identified satellite communication frequency $f_S$ during a non-interfering period of time based on the pattern of frequency usage by the satellite 300. The high altitude platform 200 has an altitude lower than the satellite 300.

In some implementations, the method 700 further includes receiving the identifications of the one or more satellite communication frequencies $f_S$ used by the satellite 300 from mobile devices (e.g., terrestrial terminals 110). In some examples, the mobile devices 110 are located on the earth 5.

In some examples, the method 700 includes steering, by the data processing hardware 900, an antenna 122 (e.g., a phased array antenna) of the terrestrial terminal 110 away from the high altitude platform 200 and toward the satellite 300 for a period of time when the terrestrial terminal 110 is not communicating with the high altitude platform 200. In addition, the method 700 includes identifying, using the antenna 122 of the terrestrial terminal 110, the one or more satellite communication frequencies $f_S$ used by the satellite 300 at the corresponding locations of the satellite 300. Identifying the one or more satellite communication frequencies $f_S$ used by the satellite 300 may include measuring a signal power at a target frequency band. The method 700 may also include receiving the identifications of the one or more satellite communication frequencies $f_S$ used by the satellite 300 from the terrestrial terminal 110. The method 700 may include steering the antenna 122 of the terrestrial terminal 110 toward the high altitude platform 200 when the terrestrial terminal 110 communicates with the high altitude platform 200.

In some implementations, the method 700 further includes modifying, by the data processing hardware 900, a power, a communication frequency, or an activation of any ABS communication beams 410 of a phased array antenna 122 of the terrestrial terminal 110 that pass in a shadow projected by the satellite 300 through the high altitude platform 200 to a ground surface 550. As such the ABS communication beams 410 of the phased array antenna 122 do not interfere with the one or more satellite communication frequencies $f_S$ used by the satellite 300 (an example of which is shown in FIG. 6A).

The method 700 may include receiving, at the data processing hardware 900, identifications of one or more target communication frequencies f, $f_H$ used by at least one other frequency band user (e.g., the high altitude platform 200). The method 700 may also include determining, using the data processing hardware 900, a pattern of frequency usage by the at least one other frequency band user. The method 700 may include instructing, by the data processing hardware 900, communication between the terrestrial terminal 110 and the high altitude platform 200 using an identified satellite communication frequency $f_S$ or an identified target communication frequency f during a non-interfering period of time based on the pattern of frequency usage by the satellite 300 and the pattern of frequency usage by the other least one frequency band user. For example, the data processing hardware 900, may determine a pattern of frequency usage by the satellite and a different pattern of frequency usage by the high altitude platform 200. As such, the data processing hardware 900 instructs the terrestrial terminal 110 and the high altitude platform 200 to communicate over a frequency f during a non-interfering period of time based on the pattern of frequency usage by the satellite 300 and the pattern of frequency usage by the high altitude platform 200.

Additionally, the method 700 may include predicting, by the data processing hardware 900, potential communication interferences between each communication beam 410, 420 of the high altitude platform 200 and the satellite 300 based on a satellite map 562. Determining the pattern of frequency usage by the satellite 300 includes generating the satellite map 562. The satellite map 562 includes satellite locations of the satellite; and for each satellite location, at least one of a communication frequency or a communication signal power of the satellite.

In some implementations, the method 700 further includes predicting, by the data processing hardware 900, potential communication interferences between each communication beam 410, 420 of the high altitude platform 200 and the satellite 300 based on the pattern of frequency usage by the satellite 300. For each ABS communication beam 410 of the high altitude platform 200, the method 700 includes selecting an identified satellite communication frequency $f_s$ for any communications 20 via the ABS communication beam 410 during a corresponding non-interfering period of time for the ABS communication beam 410.

Figure 8:
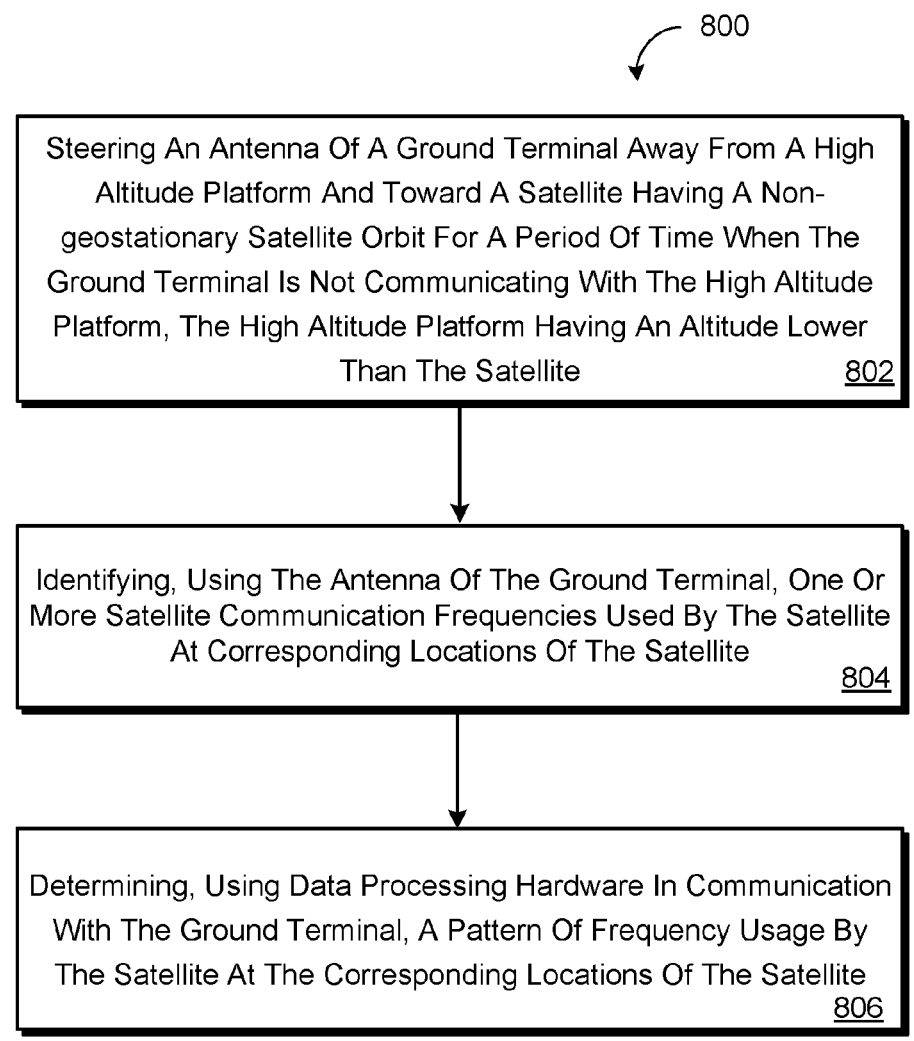
FIG. 8 provides an exemplary arrangement of operations for a method of determining a pattern of frequency used by the satellite at the corresponding locations of the satellite.

FIG. 8 illustrates an exemplary arrangement of operations for method 800 of determining a pattern of frequency used by the satellite at corresponding locations of the satellite 300. At block 802, the method 800 includes steering an antenna 122 (e.g., a phased array antenna) of a terrestrial terminal 110 away from a high altitude platform 200 and toward a satellite 300 having a non-geostationary satellite orbit (i.e., the satellite that moved with respect to the terrestrial terminal 110) for a period of time when the terrestrial terminal 110 is not communicating with the high altitude platform 200. The high altitude platform 200 has an altitude lower than the satellite 300. At block 804, the method 800 includes identifying, using the antenna 122 of the terrestrial terminal 110, one or more satellite communication frequencies f, $f_S$ used by the satellite 300 at corresponding locations of the satellite 300. At block 806, the method 800 includes determining, using data processing hardware 900 in communication with the terrestrial terminal 110, a pattern of frequency usage (e.g., FIG. 5H) by the satellite 300 at the corresponding locations of the satellite 300.

In some implementations, the method 800 further includes steering the antenna 122 of the terrestrial terminal 110 toward the high altitude platform 200 when the terrestrial terminal 110 communicates with the high altitude platform 200. The method may also include instructing, by the data processing hardware 900, communication between the terrestrial terminal 110 and the high altitude platform 200 using an identified satellite communication frequency f, $f_S$ during a non-interfering period of time based on the pattern of frequency usage by the satellite 300. The method 800 may also include modifying, by the data processing hardware 900, a power, a communication frequency, or an activation of any communication beams of the antenna of the terrestrial terminal 110 that pass in a shadow projected by the satellite through the high altitude platform 200 to a ground surface 550, when the communication frequency includes the one or more satellite communication frequencies. In some examples, identifying the one or more satellite communication frequencies f, $f_S$ used by the satellite includes measuring a signal power at a target frequency band.

In some implementations, the method includes steering the antenna 122 of the terrestrial terminal 110 away from the high altitude platform 200 and toward at least one other band user (e.g., a satellite 300) for another period of time when the terrestrial terminal 110 is not communicating with the high altitude platform. The method 800 may also include identifying, using the phased array antenna 122 of the terrestrial terminal 110, one or more target communication frequencies f, $f_S$ used by the at least one other band user. The method 800 also includes determining, using data processing hardware 900 in communication with the terrestrial terminal 110, a pattern of frequency usage by the at least one other band user. In some examples, the method 800 includes steering the antenna 122 of the terrestrial terminal 110 toward the high altitude platform 200 when the terrestrial terminal 110 communicates with the high altitude platform 200. The method 800 may also include instructing, by the data processing hardware 900, communication between the terrestrial terminal 110 and the high altitude platform 200 using an identified satellite communication frequency f, $f_S$ or an identified target communication frequency during a non-interfering period of time based on the pattern of frequency usage by the satellite 300 and the pattern of frequency usage by the at least one other band user.

In some examples, the high altitude platform 200 includes a phased array antenna 220 configured to project multiple communication beams 410, 420 (i.e., ABS communication beam 410 and satellite communication beam 420) toward earth 5. Each communication beam 410, 420 may have a corresponding communication beam frequency f, $f_S$, $f_H$.

In some examples, the method 800 includes predicting, by the data processing hardware 900, potential communication interferences between each communication beam of the high altitude platform 200 and the satellite 300 based on the pattern of frequency usage by the satellite 300. Determining the pattern of frequency usage by the satellite 300 includes generating a satellite map 562. The satellite map 562 may include satellite locations of the satellite, and for each satellite location, at least one of a communication frequency or a communication signal power of the satellite. The method may also include for each ABS communication beam 410 of the high altitude platform 200, selecting an identified satellite communication frequency f, $f_S$, as the communication beam frequency f, $f_S$, during a corresponding non-interfering period of time for the ABS communication beam 410 based on the pattern of frequency usage by the satellite 300 or the predicted potential communication interferences.

Figure 9:
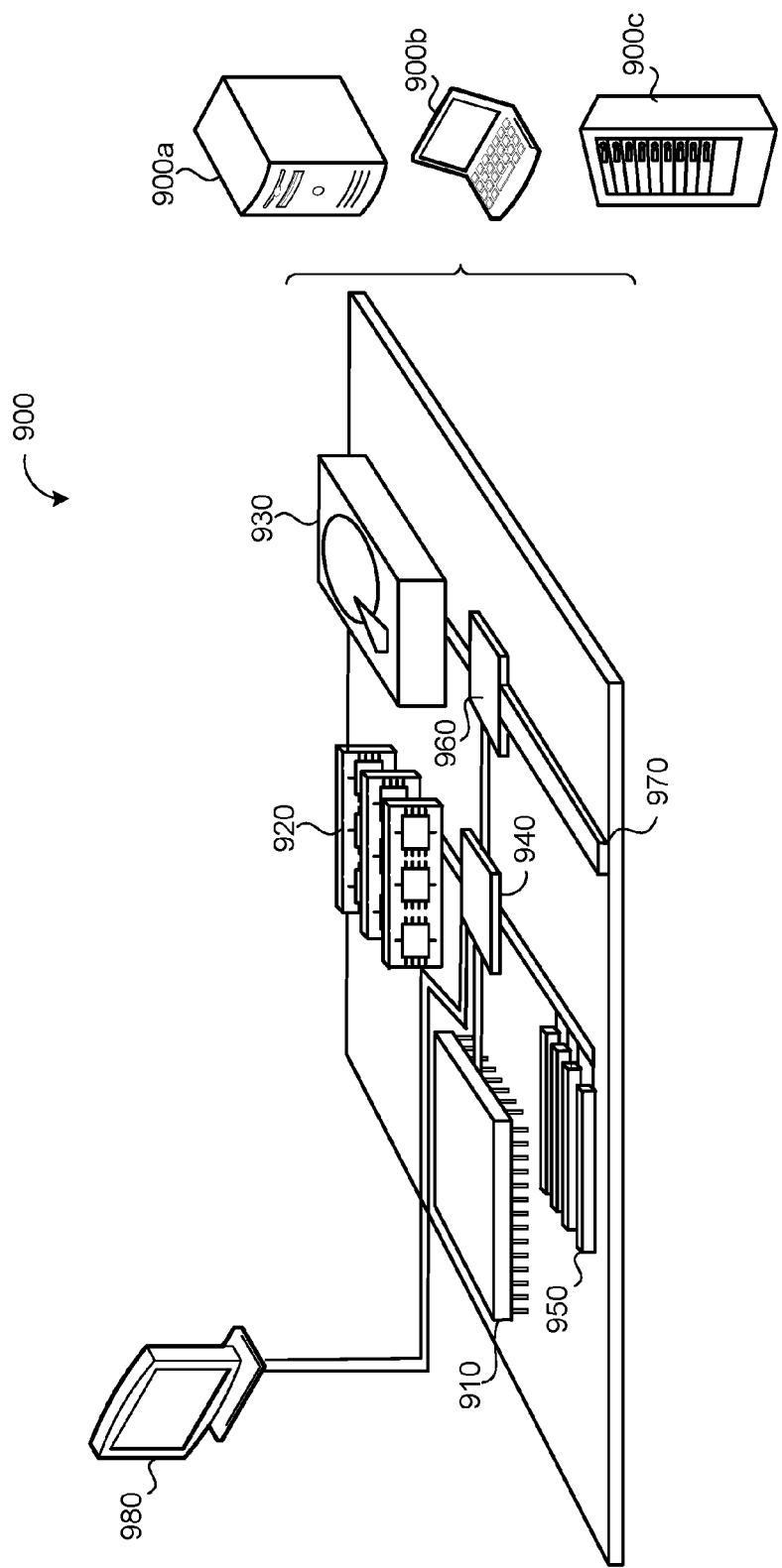
FIG. 9 is a schematic view of an exemplary computer system for operation of the method.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, identifications of one or more satellite communication frequencies used by a satellite at corresponding locations of the satellite along a non-geostationary satellite orbit;
   determining, by the data processing hardware, a pattern of frequency usage by the satellite at the corresponding locations of the satellite; and
   instructing, by the data processing hardware, communication between a high altitude platform and a ground terminal using an identified satellite communication frequency during a non-interfering period of time based on the pattern of frequency usage by the satellite, the high altitude platform having an altitude lower than the satellite.

2. The method of claim 1, further comprising receiving the identifications of the one or more satellite communication frequencies used by the satellite from mobile devices.

3. The method of claim 1, further comprising:
   steering, by the data processing hardware, an antenna of the ground terminal away from the high altitude platform and toward the satellite for a period of time when the ground terminal is not communicating with the high altitude platform;
   identifying, using the antenna of the ground terminal, the one or more satellite communication frequencies used by the satellite at the corresponding locations of the satellite; and receiving the identifications of the one or more satellite communication frequencies used by the satellite from the ground terminal.

4. The method of claim 3, wherein the antenna comprises a phased array antenna.

5. The method of claim 3, wherein identifying the one or more satellite communication frequencies used by the satellite comprises measuring a signal power at a target frequency band.

6. The method of claim 3, further comprising steering the antenna of the ground terminal toward the high altitude platform when the ground terminal communicates with the high altitude platform.

7. The method of claim 1, further comprising modifying, by the data processing hardware, a power, a communication frequency, or an activation of any communication beams of a phased array antenna of the ground terminal that pass in a shadow projected by the satellite through the high altitude platform to a ground surface, so as to not interfere with the one or more satellite communication frequencies used by the satellite.

8. The method of claim 1, further comprising:
receiving, at data processing hardware, identifications of one or more target communication frequencies used by at least one other frequency band user;
determining, using the data processing hardware, a pattern of frequency usage by the at least one other frequency band user; and
instructing, by the data processing hardware, communication between the ground terminal and the high altitude platform using an identified satellite communication frequency or an identified target communication frequency during a non-interfering period of time based on the pattern of frequency usage by the satellite and the pattern of frequency usage by the other least one frequency band user.

9. The method of claim 1, further comprising predicting, by the data processing hardware, potential communication interferences between each communication beam of the high altitude platform and the satellite based on a satellite map, wherein determining the pattern of frequency usage by the satellite comprises: generating the satellite map, the satellite map comprising: satellite locations of the satellite; and for each satellite location, at least one of a communication frequency or a communication signal power of the satellite.

10. The method of claim 1, further comprising:
predicting, by the data processing hardware, potential communication interferences between each communication beam of the high altitude platform and the satellite based on the pattern of frequency usage by the satellite; and
for each communication beam of the high altitude platform, selecting an identified satellite communication frequency for any communications via the communication beam during a corresponding non-interfering period of time for the communication beam.

11. A method comprising:
steering an antenna of a ground terminal away from a high altitude platform and toward a satellite having a non-geostationary satellite orbit for a period of time when the ground terminal is not communicating with the high altitude platform, the high altitude platform having an altitude lower than the satellite;
identifying, using the antenna of the ground terminal, one or more satellite communication frequencies used by the satellite at corresponding locations of the satellite; and
determining, using data processing hardware in communication with the ground terminal, a pattern of frequency usage by the satellite at the corresponding locations of the satellite.

12. The method of claim 11, wherein the antenna of the ground terminal comprises a phased array antenna.

13. The method of claim 11, further comprising:
steering the antenna of the ground terminal toward the high altitude platform when the ground terminal communicates with the high altitude platform; and
instructing, by the data processing hardware, communication between the ground terminal and the high altitude platform using an identified satellite communication frequency during a non-interfering period of time based on the pattern of frequency usage by the satellite.

14. The method of claim 13, further comprising modifying, by the data processing hardware, a power, a communication frequency, or an activation of any communication beams of the antenna of the ground terminal that pass in a shadow projected by the satellite through the high altitude platform to a ground surface, when the communication frequency comprises the one or more satellite communication frequencies.

15. The method of claim 11, wherein identifying the one or more satellite communication frequencies used by the satellite comprises measuring a signal power at a target frequency band.

16. The method of claim 11, further comprising:
steering the antenna of the ground terminal away from the high altitude platform and toward at least one other band user for another period of time when the ground terminal is not communicating with the high altitude platform;
identifying, using the phased array antenna of the ground terminal, one or more target communication frequencies used by the at least one other band user; and
determining, using data processing hardware in communication with the ground terminal, a pattern of frequency usage by the at least one other band user.

17. The method of claim 16, further comprising:
steering the antenna of the ground terminal toward the high altitude platform when the ground terminal communicates with the high altitude platform; and
instructing, by the data processing hardware, communication between the ground terminal and the high altitude platform using an identified satellite communication frequency or an identified target communication frequency during a non-interfering period of time based on the pattern of frequency usage by the satellite and the pattern of frequency usage by the at least one other band user.

18. The method of claim 11, wherein high altitude platform comprises a phased array antenna configured to project multiple communication beams toward earth, each communication having a corresponding communication beam frequency.

19. The method of claim 18, further comprising predicting, by the data processing hardware, potential communication interferences between each communication beam of the high altitude platform and the satellite based on the pattern of frequency usage by the satellite.

20. The method of claim 19, wherein determining the pattern of frequency usage by the satellite comprises generating a satellite map, the satellite map comprising:
satellite locations of the satellite; and for each satellite location, at least one of a communication frequency or a communication signal power of the satellite.

21. The method of claim 19, further comprising for each communication beam of the high altitude platform, selecting an identified satellite communication frequency as the communication beam frequency during a corresponding non-interfering period of time for the communication beam based on the pattern of frequency usage by the satellite or the predicted potential communication interferences.

* * * * *